US011223667B2

(12) United States Patent
Magzimof et al.

(10) Patent No.: US 11,223,667 B2
(45) Date of Patent: Jan. 11, 2022

(54) LOW LATENCY WIRELESS COMMUNICATION SYSTEM FOR TELEOPERATED VEHICLE ENVIRONMENTS

(71) Applicant: Phantom Auto Inc., Mountain View, CA (US)

(72) Inventors: Shay Magzimof, Palo Alto, CA (US); Yuval Deri, Petach Tikva (IL); David Parunakian, Moscow (RU); Gleb Mezhanskiy, San Francisco, CA (US); Alexander Efitorov, Nizhniy Novgorod (RU); Elrom Silvera, Kfar Saba (IL)

(73) Assignee: Phantom Auto Inc., Mountain View, CA (US)

( * ) Notice: Subject to any disclaimer, the term of this patent is extended or adjusted under 35 U.S.C. 154(b) by 0 days.

(21) Appl. No.: 16/862,513

(22) Filed: Apr. 29, 2020

(65) Prior Publication Data

US 2020/0351322 A1 Nov. 5, 2020

Related U.S. Application Data

(60) Provisional application No. 62/841,194, filed on Apr. 30, 2019.

(51) Int. Cl.
*H04N 7/18* (2006.01)
*H04L 29/06* (2006.01)
(Continued)

(52) U.S. Cl.
CPC ........ *H04L 65/607* (2013.01); *H04L 43/0852* (2013.01); *H04L 43/16* (2013.01);
(Continued)

(58) Field of Classification Search
CPC ... H04L 65/607; H04L 43/16; H04L 43/0852; H04L 67/025; H04L 65/602;
(Continued)

(56) References Cited

U.S. PATENT DOCUMENTS 9,806,988 B2 10/2017 Kaplan et al.
10,234,538 B1 3/2019 Fortney
(Continued)

FOREIGN PATENT DOCUMENTS

JP 2009-284149 A 12/2009
JP 2009284149 A * 12/2009
(Continued)

OTHER PUBLICATIONS

Christophe et al, English Translation of the WO application 2012013637 A1 (Year: 2012).*
(Continued)

*Primary Examiner* — Shan E Elahi
(74) *Attorney, Agent, or Firm* — Fenwick & West LLP

(57) ABSTRACT

A vehicle remote support system includes a communication system that operates over a plurality of parallel wireless network connections to provide low-latency video from vehicle to a remote support server that provides remote support to the vehicle dependent on real-time video. The vehicle includes a source that encodes multiple versions of the original video segments (e.g., one per wireless network connection) and transmits the multiple versions of the segments to a sink at the remote support server over the respective wireless connections. This redundant multi-path communication system rationally allocates network resources to the managed video streams and balances bandwidth against latency in order to avoid network congestion and safety issues associated with single-path transmissions. In other embodiments, a similar communication system that
(Continued)

transmits video or other real-time messages between a source and a sink may be utilized in cloud robotics applications.

20 Claims, 12 Drawing Sheets

(51) Int. Cl.
  *H04L 12/26* (2006.01)
  *H04N 19/61* (2014.01)
  *H04N 19/164* (2014.01)
  *H04N 19/172* (2014.01)
  *H04L 29/08* (2006.01)
(52) U.S. Cl.
  CPC ......... *H04L 67/025* (2013.01); *H04N 19/164* (2014.11); *H04N 19/172* (2014.11); *H04N 19/61* (2014.11)
(58) Field of Classification Search
  CPC ..... H04L 65/4069; H04L 65/80; H04N 19/61; H04N 19/164; H04N 19/172; H04N 19/46; H04N 19/154; H04N 19/179; H04N 19/159; H04N 19/103
  USPC ..................................................... 375/240.02
  See application file for complete search history.

(56) References Cited

U.S. PATENT DOCUMENTS

| | | | |
|---|---|---|---|
| 2010/0033622 A1* | 2/2010 | Bellers | H04N 19/39 |
| | | | 348/448 |
| 2012/0013637 A1* | 1/2012 | Edwards | G06T 11/001 |
| | | | 345/593 |
| 2012/0137319 A1 | 5/2012 | Schooling et al. | |
| 2012/0180101 A1 | 7/2012 | Davis et al. | |
| 2012/0317308 A1* | 12/2012 | Penner | H04L 65/4092 |
| | | | 709/239 |
| 2012/0320916 A1 | 12/2012 | Sebastian | |
| 2013/0094522 A1 | 4/2013 | Moshfeghi | |
| 2013/0133028 A1* | 5/2013 | Raleigh | H04W 4/20 |
| | | | 726/1 |
| 2013/0246577 A1 | 9/2013 | Gonzales et al. | |
| 2014/0025648 A1 | 1/2014 | Corbett et al. | |
| 2015/0145944 A1* | 5/2015 | Stonefield | H04L 65/4061 |
| | | | 348/14.02 |
| 2015/0201023 A1 | 7/2015 | Kotab | |
| 2015/0271500 A1* | 9/2015 | Kouno | H04N 19/395 |
| | | | 375/240.02 |
| 2016/0066357 A1* | 3/2016 | Goldhamer | H04W 16/14 |
| | | | 455/426.1 |
| 2016/0227017 A1 | 8/2016 | Kotab | |
| 2016/0323652 A1 | 11/2016 | Beals | |
| 2016/0381110 A1 | 12/2016 | Barnett et al. | |
| 2017/0048328 A1 | 2/2017 | Korotaev et al. | |
| 2017/0251515 A1* | 8/2017 | Altman | H04L 61/2503 |
| 2018/0123963 A1 | 5/2018 | Thubert et al. | |
| 2018/0218073 A1 | 8/2018 | Wilshinsky et al. | |
| 2019/0141545 A1 | 5/2019 | Dang et al. | |

FOREIGN PATENT DOCUMENTS

| | | | | |
|---|---|---|---|---|
| WO | WO 2012/013637 A1 | | 2/2012 | |
| WO | WO-2012013637 A1 * | | 2/2012 | ........... H04L 1/0015 |

OTHER PUBLICATIONS

Garcia-Roger, D. et al., "5G Functional Architecture and Signaling Enhancements to Support Path Management for eV2X," IEEE Access, vol. 7, Feb. 6, 2019, pp. 20484-20498.
PCT Invitation to Pay Additional Fees, PCT Application No. PCT/US20/30568, Jun. 25, 2020, three pages.
Das, A.K. et al., "Optimization models for fixed channel assignment in wireless mesh networks with multiple radios," IEEE, Oct. 2005, pp. 1-12.
PCT International Search Report and Written Opinion, PCT Application No. PCT/US20/36013, dated Sep. 8, 2020, 20 pages.
PCT International Search Report and Written Opinion, PCT Application No. PCT/US20/30568, dated Sep. 14, 2020, 21 pages.
United States Office Action, U.S. Appl. No. 16/892,264, dated Jun. 21, 2021, 21 pages.

* cited by examiner

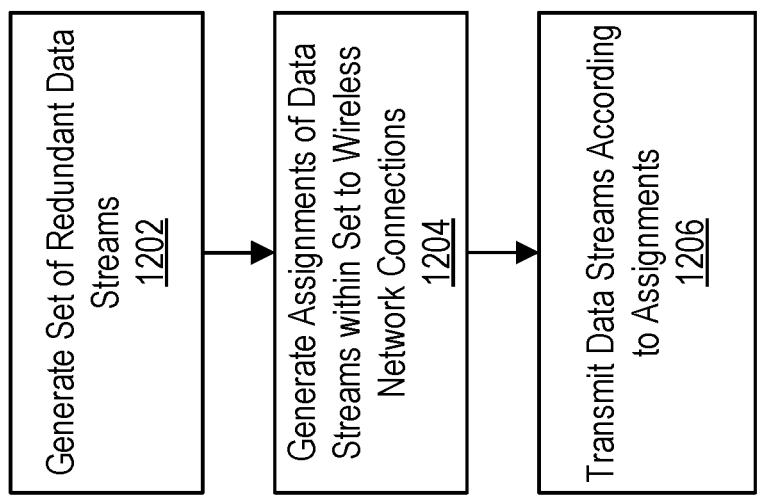

LOW LATENCY WIRELESS COMMUNICATION SYSTEM FOR TELEOPERATED VEHICLE ENVIRONMENTS

CROSS-REFERENCE TO RELATED APPLICATIONS

This application claims the benefit of U.S. Provisional Patent Application No. 62/841,194 filed on Apr. 30, 2019, the contents of which are incorporated by reference herein.

BACKGROUND

Technical Field

The disclosed embodiments relate generally to the field of remote teleoperation and more specifically to a system and method for maintaining redundant low latency data transmission channels over multiple wireless links.

Description of the Related Art

The past decade has seen rapid centralization of computational power across the globe, with the mainstream computing paradigm shifting to large-scale data centers serving all manners of clients over the network. In conjunction with advances in wireless network technologies, this development enables further improvement of technologies such as cloud robotics and other data and computationally intensive industrial applications.

A key factor for these applications is the development of techniques for reliable and low-latency data transmission over wireless networks, including public cellular carriers. Due to the specifics of modern network engineering, data transmission even at a slightly higher bit rate than can be supported by a network link at the time may generate buffer bloat and lead to network congestion, detrimentally affecting data latency. To solve this problem, congestion control algorithms and methods are being actively researched.

However, congestion control algorithms for single-path transmissions alone cannot provide the safety level demanded by cloud robotics applications that require monitoring states of remote clients or their environment and supervising their actions in substantially real time. This issue is especially exacerbated in scenarios involving public networks and highly-mobile robotic units such as autonomous vehicles.

SUMMARY OF THE EMBODIMENTS

A system, method, and non-transitory computer-readable storage medium facilitates wireless transmission of low latency video or other data for teleoperation or other remote support, monitoring, or control applications.

In another embodiment, a teleoperated vehicle generates a plurality of data including subsets of complementary data streams having redundant data. A network orchestrator generates assignments for transmitting the plurality of data streams over at least two different wireless network connections. The assignments are made so that each data stream within one of the subsets of complementary data streams is assigned to different ones of the wireless network connections. A plurality of communication units transmits the plurality of data streams over the at least two wireless network connections based on the assignments.

In an embodiment, generating the assignments by the network orchestrator comprises applying an optimization algorithm to optimize the assignments according to a predefined optimization criterion. The optimization criterion may comprise at least one of minimizing predicting latency, minimizing predicted network congestion, and maximizing predicted quality. Furthermore, the assignments may be based at least in part on a machine-learned model derived from simulations of a vehicle traversing areas of varying network conditions.

In an embodiment, a source (e.g., a teleoperated vehicle) wirelessly communicates low latency video to a remote support server during a remote support session. The source receives a first video feed from a first camera. A first encoder encodes the first video segment of the first video feed to generate a first encoded video segment, and a second encoder encodes the first video segment to generate a second encoded video segment that includes redundant video data to the first encoded video segment. A first communication unit transmits the first encoded video segment over a first wireless network connection and a second communication unit transmits the second encoded video segment over a second wireless network connection different than the first wireless network connection.

In a further embodiment, a sink (e.g., a remote support server) wirelessly receives low latency video for supporting a teleoperated vehicle during a remote support session. A remote support session with a vehicle is established. A video processor receives a first encoded video segment and a segment identifier for the first encoded video segment from a first wireless network connection. The video processor determines that the segment identifier is absent from a segment identifier buffer. Responsive to determining that the segment identifier is absent from the segment identifier buffer, the video processor stores the segment identifier to the segment identifier buffer and provides the first encoded video segment to a video device. The video processor furthermore receives a second encoded video segment and the segment identifier from a second wireless network connection different than the first wireless network connection. The second encoded video segment includes redundant video data to the first encoded video segment. The video processor determines that the segment identifier is present in the segment identifier buffer. Responsive to determining that the segment identifier is present in the segment identifier buffer, the video processor discards the second encoded video segment.

In an embodiment, the first wireless network connection comprises a first cellular network connection to a first cellular network operated by a first wireless carrier, and the second wireless network connection comprises a second cellular network connection to a second cellular network operated by a second wireless carrier different than the first wireless carrier. In another embodiment, the first wireless network connection operates according to a first communication protocol and the second wireless network connection operates according to a second communication protocol different than the first communication protocol. In another embodiment, the first wireless network connection is facilitated by first networking infrastructure and the second wireless network connection is facilitated by second networking infrastructure different than the first networking infrastructure. In another embodiment, the wireless network connections are facilitated over wireless networks comprising arbitrary heterogeneous combinations of wireless networking technologies. For example, the first wireless network connection may comprise a cellular network connection to a cellular network operated by a wireless carrier, and the second wireless network connection may comprise a connection to a different type of wireless network including WiFi networking infrastructure, a microwave or a LEO satellite communications link. Furthermore, the first wireless network connection and the second wireless network connection may operate according to different performance parameters.

In another embodiment, a remote support server establishes a remote support session with a vehicle. A video processor receives a first encoded video segment from a first wireless network connection and determines a first video performance indicator associated with the first encoded video segment. The video processor receives a second encoded video segment from a second wireless network connection different than the first wireless network connection. Here, the second encoded video segment representing redundant video data to the first encoded video segment. The segment processor determines a second video performance indicator associated with a second encoded video segment. The video processor then determines a selected video segment selected between the first encoded video segment and the second encoded video segment based on the first and second video performance indicators, and outputs the selected video segment to a video device.

BRIEF DESCRIPTION OF THE DRAWINGS

FIG. 12 is a flowchart illustrating an example embodiment of a process for wirelessly communicating redundant data streams from a source to a sink using multiple wireless connections.

DETAILED DESCRIPTION

A remote support system includes a communication system that operates over a plurality of parallel wireless network connections to provide low-latency composite video feeds from vehicle to a remote support server that provides remote support to the vehicle dependent on real-time video. The vehicle includes a source that encodes multiple versions of the original video segments (e.g., one per wireless network connection) and transmits the multiple versions of the segments to a sink at the remote support server over the respective wireless connections. This redundant multi-path communication system rationally allocates network resources to the managed video streams and balances bandwidth against latency in order to avoid network congestion and safety issues associated with single-path transmissions. In other embodiments, a similar communication system that transmits video or other real-time messages between a source and a sink may be utilized in cloud robotics applications.

Figure 1:
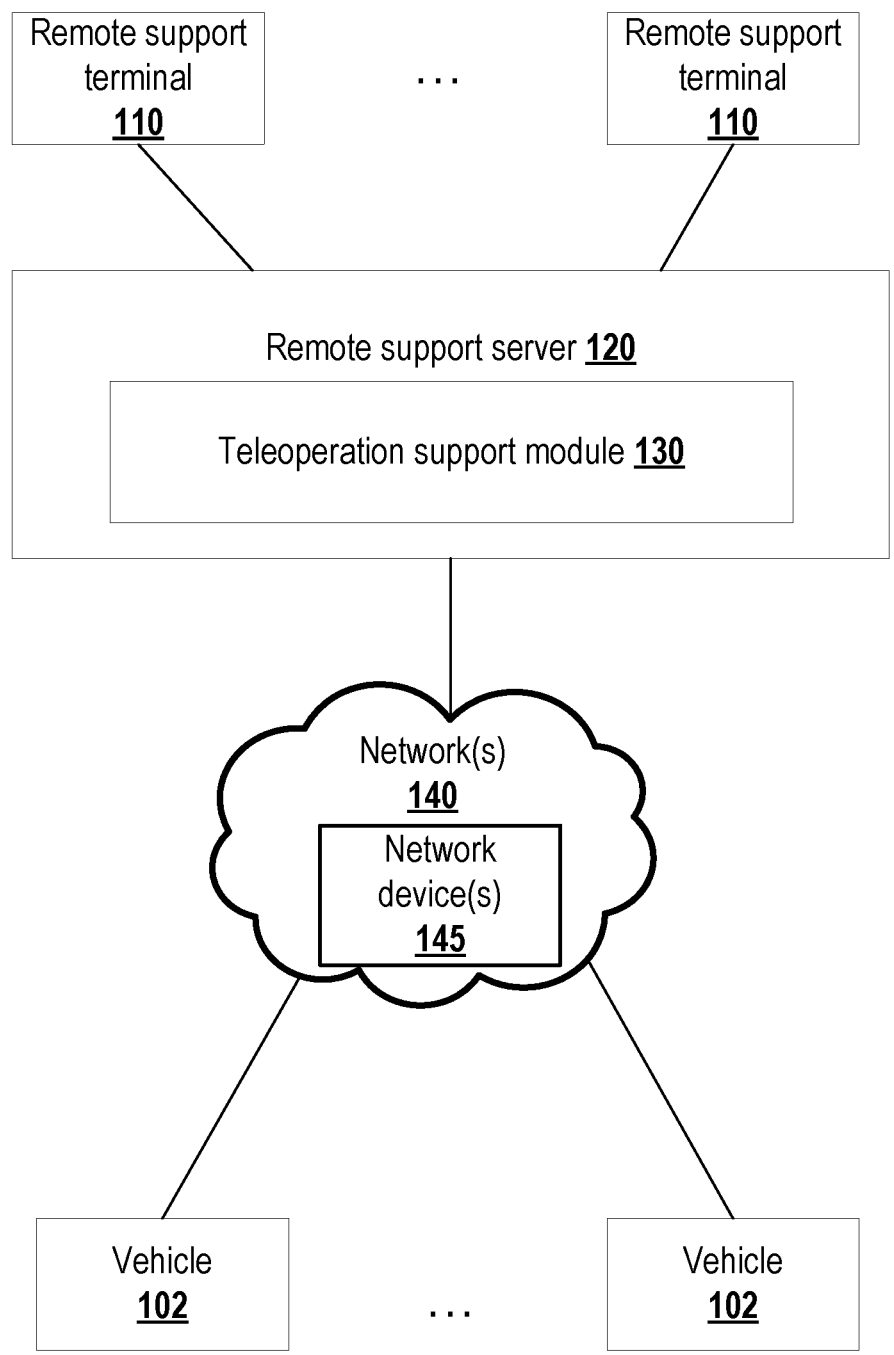
FIG. 1 is a diagram illustrating a system environment for teleoperating a vehicle.

FIG. 1 is a block diagram of a vehicle environment 100 for a teleoperation or other remote support application. The vehicle environment 100 that includes a plurality of vehicles 102, a remote support server 120 coupled to one or more remote support terminals 110, and one or more networks 140 comprising network devices 145. In alternative embodiments, the vehicle environment 100 may include different or additional components.

The vehicle 102 comprises a land vehicle (e.g. a car or truck), a seaborne vehicle, a subterranean vehicle, an airborne vehicle, or other vehicle. The vehicle 102 can include, for example, a transport vehicle for transporting passengers or cargo, a surveillance vehicle (e.g., a unmanned aerial vehicle or drone), an operational vehicle such as a forklift or other container yard vehicle, an agricultural vehicle such as a tractor, or any other type of vehicle or robot that can move through an environment. The vehicle 102 may comprise an intelligent transport system (ITS) that connects to one or more networks 140 and communicates with one or more entities via the one or more networks 140 (e.g., the remote support server 120 and/or other vehicles 102) to enable the vehicle 102 to obtain information useful to safe navigation of an environment. In an embodiment, the vehicle 102 may comprise an autonomous or semi-autonomous vehicle that includes an autonomous driving system that automatically controls navigation based on sensed environment conditions. Alternatively, the vehicle 102 may comprise a non-autonomous vehicle that relies on control inputs from a driver in the vehicle 102 or from the remote support server 120. In the case of teleoperation, the vehicle 102 wirelessly receives control inputs via the one or more networks 140 that control various components of the drive system such as the steering system, acceleration, braking, etc. The vehicle 102 may also comprise various sensors such as optical or infrared cameras, ranging devices such as LIDAR, sonar or radar units, other sensor types allowing real-time acquisition of data on the vehicle environment 100, vehicle 102 components and occupants, that capture image data and other environmental data that may be streamed over one or more networks 140 to a remote support server 120 or to other vehicles 102.

The vehicle 102 may depend on a reliable network connection for streaming video or other sensor data to the remote support server 120 and for receiving control inputs or data used by the vehicle 102 to navigate in a safe and efficient manner. For example, to provide teleoperation support to a vehicle 102, it is important that the video stream is received at the remote support server 120 in real-time with a latency as low as possible. Therefore, the vehicle 102 may switch between different networks 140, may switch between different connections to different network devices 145 of the networks 140, and may maintain multiple simultaneous connections over the same or different networks to optimize its connectivity as described in further detail below.

The remote support server 120 includes a teleoperation support module 130 that may be implemented as one or more non-transitory computer-readable storage mediums that stores instructions executed by one or more processors to perform the functions attributed herein. In an embodiment, the teleoperation support module 130 communicates with a vehicle 102 to provide teleoperation or other support services in instances when extra assistance is desired. For example, the vehicle 102 may request teleoperation assistance from the teleoperation support module 130 when one or more vehicle sensors fail, when an unknown problem occurs with the vehicle's autonomous driving software, when the vehicle 102 encounters a barrier or other hazardous road conditions, or when a passenger manually requests remote assistance. Furthermore, the teleoperation support module 130 may provide teleoperation support when the vehicle 102 enters a geographic region where it is not legally permitted to operate in a completely autonomous way.

In an embodiment, upon requesting remote support, a video stream capturing the vehicle environment may be provided by the vehicle 102 to the teleoperation support module 130 and presented at a remote support terminal 110. A human teleoperator at the remote support terminal 110 may view the video stream on a display to assess the situation and take appropriate action via a control input device at the remote support terminal 110. In this embodiment, the teleoperation support module 130 may present real-time video streamed from the vehicle 102 to a display of the remote support terminal 110 and may provide real-time control data to the vehicle 102 received via the remote support terminal 110 to enable the teleoperator remotely drive the vehicle 102.

In another embodiment, the teleoperation support module 130 may comprise an artificial intelligence agent that does not necessarily require a remote support terminal 110 with a display or physical controls for providing human input. Here, the teleoperation support module 130 may provide control instructions to the vehicle 102 directly based on the processing of a real-time video feed and other sensor data streamed to the teleoperation support module 130 from the vehicle 102 without necessarily utilizing any human input.

The remote support terminals 110, if present, may be coupled to the remote support server 120 via a local area network connection, a direct wired connection, or via a remote connection through the network 140. A remote support terminal 110 may include a display to enable a human teleoperator to view real-time video of the vehicle environment and controls for enabling a human teleoperator to control the vehicle. In an embodiment, the video may include at least a front view that mimics or approximates the view seen by a driver within the vehicle 102. Optionally, the video may include additional views, such as a rear view video, side view videos, or other views that may mimic the views seen by a driver in mirrors of a traditional vehicle or may include other views not necessarily available to a driver of a traditional vehicle. The controls may include controls that mimic those available within a traditional vehicle such as a steering wheel, acceleration pedal, and brake pedal. Alternatively, different forms of controls may be available at the remote terminal 110 such as a joystick, mouse, touch screen, voice control system, gesture control system, or other input mechanism to control one or more aspects of the vehicle 102.

In other embodiments, where the teleoperation support module 130 operates entirely as an artificial intelligence agent without human intervention, the remote support terminals 110 may be omitted.

In further embodiments, where the remote support server 120 may provide other forms of remote support that do not necessarily involve direct teleoperation, parts of the remote support terminal 110 and the teleoperation support module 130 may be omitted. For example, the remote support server 120 may enable remote monitoring without necessarily providing control or remote assistance in which a remote operator provided verbal or message-based information that enables a human driver or automated drive system of the vehicle to make control decisions. In other embodiments, the remote support server 120 may provide limited control functions such as causing the vehicle 102 to brake or shut off without being able to control other functions such as steering or acceleration.

The plurality of networks 140 represents the communication pathways between the vehicles 102, the remote support terminals 110, and the remote support server 120. In one embodiment, the networks 140 use standard communications technologies and/or protocols and can include the Internet. In another embodiment, the entities on the networks 140 can use custom and/or dedicated data communications technologies. The plurality of networks 140 may comprise networks of different types such as, for example, a public cellular connection (e.g., 4G or 5G), a dedicated or private wireless network (e.g., WiFi), a low-latency satellite uplink, VANET wireless channels (including vehicle-to-vehicle or vehicle-to-infrastructure links), or any combination thereof. Furthermore, the plurality of networks 140 may include multiple networks of the same type operated by different service providers. For example, the networks 140 may include two or more different cellular networks operated by different cellular carriers, having different network parameters, and having different physical infrastructure. Additionally, the networks may include two more WiFi networks operating with different network parameters and/or different network infrastructure. The network devices 145 may include cell towers, routers, switches, LEO satellite uplink devices, WiFi hotspot devices, VANET devices, or other components that provide network services to the entities connected to the plurality of networks 140. The network devices 145 may be integrated into roadside infrastructure units that are integrated with traffic devices or other roadside systems. The network devices 145 may have varying capabilities and may be spread over a wide geographic area. Thus, different allocations of network resources may be available to vehicles 102 in different locations at different times depending on environmental factors, the capabilities of different network devices 145, and network congestion in the area where each vehicle 102 is located.

In an embodiment, the network 140 can include peer-to-peer connections between the vehicle 102 and the remote support server 120 or directly with a remote support terminal 110. Here a server on the network 140 may provide some minimal handshaking to establish the connection and data may then be transmitted to and from the vehicle 102 using a peer-to-peer connection that operates with low latency.

Figure 2:
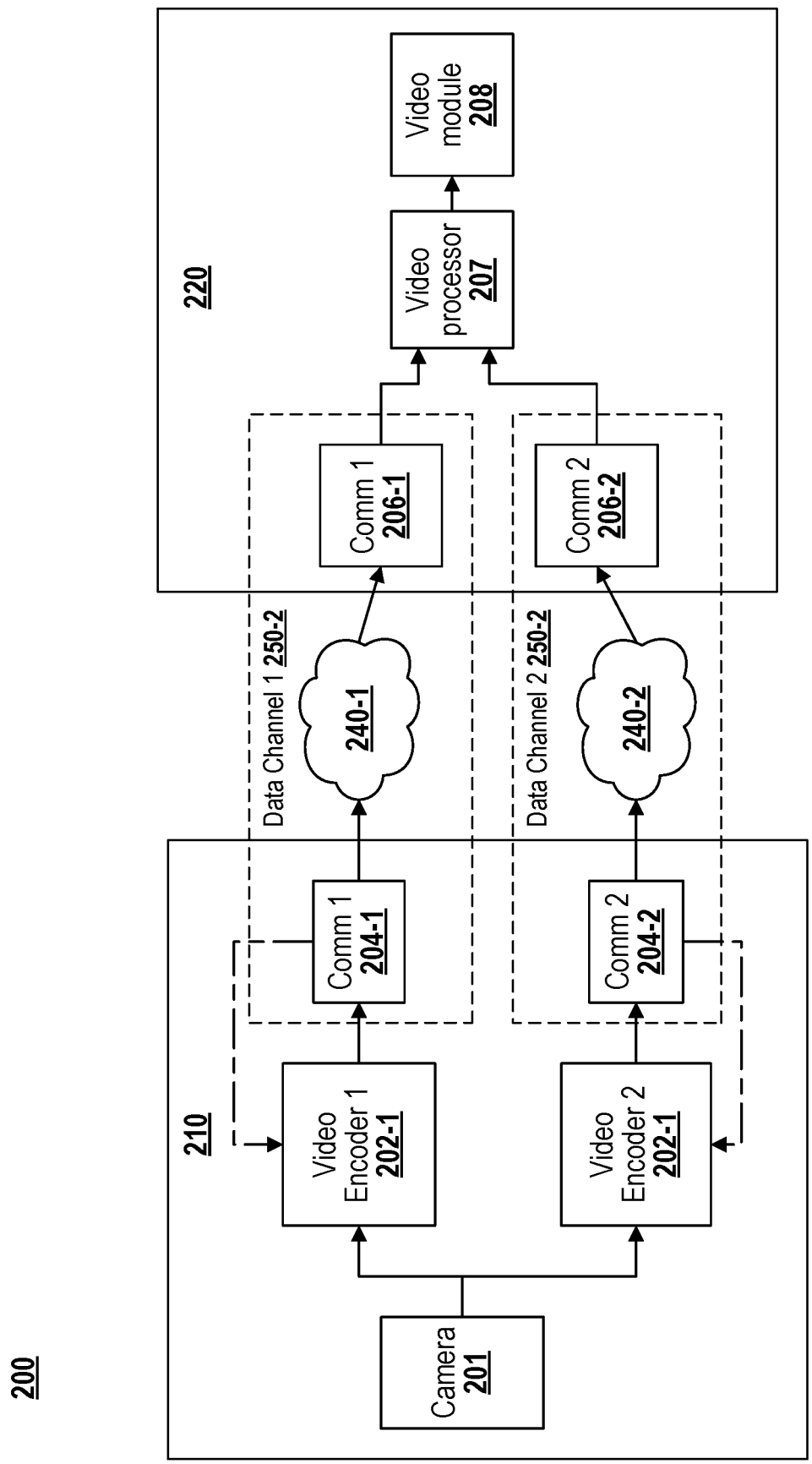
FIG. 2 is a diagram illustrating an example architecture of a dual-link video transmission system.

FIG. 2 is a diagram of an example architecture of a dual-link video transmission system 200 that serves a unidirectional video feed optimized according to particular desired criteria transmitted from a source 210 (sending terminal) to a sink 220 (receiving terminal). Here, the source 210 may be embodied in a vehicle 102 and the sink 220 may be embodied in a remote support server 120 that provides remote support to the vehicle 102 based on the captured video. In certain embodiments, the source 210 may comprise a generic connected robot (that is not necessarily a traditional transport vehicle) and the sink 220 may comprise a cloud-based server that obtains video from the robot for monitoring or control applications. The dual-link video transmission system 200 operates to provide low latency communications for real-time video transmission under a variety of network conditions.

The source 210 comprises a camera 201, two or more video encoders 202 (e.g., encoders 202-1, 202-2) and two or more communication units 204 (e.g., communication units 204-1, 204-2). The sink 220 comprises two or more communication units 206 (e.g., communication units 206-1, 206-2), a video processor 207, and a video module 208. In alternative embodiments, the source 210 and sink 220 may include different or additional components.

The source 210 and the sink 220 communicate over two or more connections with networks 240 (e.g., networks 240-1, 240-2) via a plurality of data channels 250 (collectively including the communication unit 204 of the source 210, the network 240, and the communication unit of the sink 206). The networks 240 may at least partially include different types of networks, networks operated by different carriers, networks utilizing different network infrastructure, networks operating according to different network parameter, or networks having other differences that cause performance of each network 240 to vary from each other under different operating conditions. The networks 240 may at least partially overlap. For example, the networks 240 may partially share some network infrastructure and/or each network 240 may include the Internet. In other embodiments, the networks 240 may share the same infrastructure. In this embodiment, the different networks 240-1, 240-2 represent different concurrently hosted connections between the source 210 and the sink 220 in which performance variations in the data channels 250 may occur due to differences in the communication units 204, 206, the connection protocols, or other operating parameters associated with the respective connections.

The camera 201 generates video frames and provides the video frames to each of the video encoders 202 using a suitable communication technology such as shared memory or domain sockets. The video encoders 202 execute in parallel to each encode the received video frame and generate respective encoded video segments each comprising one or more frames. The video encoders 202 may each encode the original video frames independently and agnostically of each other, and each transmit the respective encoded segments to different communication units 204. For example, the video encoder 202-1 provides an encoded segment to the communication unit 204-1 and the video encoder 202-1 provides an encoded segment to communication unit 204-1. The communication units 204 transmit the respective encoded video segments over respective networks 240 to the sink 220. The transmission over the network 240 may occur over peer-to-peer connections between the source 210 and the sink 220 or any other connection mechanism. The communication units 204 may furthermore transmit segment identifiers that identify the segment in the original video. For example, the communication units 204 may each include the same segment identifier when transmitting respective encoded segments corresponding to a same set of one or more frames of the original video. The segment identifiers may be assigned sequentially, randomly, or otherwise arbitrarily. In an embodiment, each segment may comprise only a single frame and a different segment identifier is applied for each frame. Alternatively, each segment may comprise multiple frames which may be fixed or variable length.

At the sink 220, the communication units 206 receive the respective encoded video segments from each of the networks 240. Due to variations in encoding, communication protocols, network infrastructure, network congestion, or other differences, the video segments may arrive at the communication units 206 at different times and/or with different quality or other characteristics. The video processor 207 receives the video segments from the communication units 206 and determines, for any given segment of the original video (having a unique segment identifier), which of the received encoded segments to provide to the video module 208. For example, in an embodiment, the video processor 207 may provide the video segment having the earlier arrival time to the video module 208 to minimize latency. In other embodiments, other factors may be utilized instead of or in addition to latency (e.g., quality metrics) as will be described in further detail below. The video module 208 processes the received video segments. For example, the video module 208 may comprise a video renderer that renders video for a remote support terminal 110 or a video processing element of an artificial intelligence agent of a remote support server 120 providing remote support.

In an embodiment, the communication units 204 of the source 210 may comprise a wireless network monitoring unit that supplies quality of service information to the associated video encoder 202. The video encoders 202 may then use this information in conjunction with their own transmission meta information records to adjust video encoding parameters. In this embodiment, the video encoders 202 may maintain records of data transmission meta information related to the respective outputted data segments. For example, the video encoders 202 may store information such as buffer queue length statistics collected in situ or acquired from sources such as the communication units 204, 206. The meta information may be used by the encoders 202 to dynamically adjust (e.g., in substantially real time) various video encoding parameters such as frame resolution or encoding quality to satisfy (or approach as closely as possible) a set of transmission conditions such as a maximum allowed transmission latency.

In an embodiment, each video encoder 202 may additionally comprise an application programming interface (API) to allow overriding external manipulation of encoding parameters by a high-level decision-making circuit or application coupled the source 210 (e.g., in a vehicle 102 such as a transport vehicle or robot) or a remote computer (e.g., a remote support server 120 or other connected device).

In an embodiment, each video encoder 202 may additionally comprise a messaging interface to allow the sink 220 to contribute auxiliary quality of service metrics to the video encoders 202. For example, in a teleoperation session for a vehicle 102, responsive to initiation by a teleoperator of a U-turn with a small curvature radius, the remote support server 120 (acting as the sink 220) may transmit a message to the vehicle 102 (acting as the source 210) to cause the vehicle 102 to increase video encoding quality and to provide a better view to the teleoperator. In a further embodiment, the communication units 206 and the video processor 207 of the remote support server 120 (acting as the sink 220) may comprise additional quality of service monitors and transmit a message containing the collected metrics such as packet round trip time, transmission latencies measured for specific bandwidth values, jitter or packet loss and reordering rates to the vehicle 102 (acting as the source 210) for consumption by communication units 204 and video encoders 202.

In an embodiment, each video encoder 202 may additionally comprise conditional programming functions enabling it to adjust video feed parameters proactively. For example, the source 210 may additionally comprise a GNSS unit such as GPS receiver and a geospatial database specifying typical cellular carrier bandwidth capacity, WiFi network capabilities, or parameters for other available networks. The video encoder 202 may periodically poll the GNSS unit and adjust video encoding parameters based on the rules specified in the database for the detected location. This enables the encoders 202 to automatically adjust encoding quality dependent on expected network conditions as the source 210 moves to different locations. In other embodiments, the source 210 may additionally comprise other localization technology such as a LIDAR, inertial measurement unit, radio beacon triangulation unit or a computer vision unit and a geospatial database in local or global coordinate systems.

In an embodiment, each video encoder 202 may control the rate of key frames that do not rely on interframe predictions based on detected network conditions. For example, the video encoder 202 may send key frames at a higher rate in low-reliability network conditions in order to reduce the time interval when no valid frames are available if a key frame is lost or corrupted.

In an embodiment, each video encoder 202 may individually encode the chroma and luma components of a video segment. For example, in the case of a vehicle 102 being remotely operated by a human teleoperator or machine intelligence agent, the luminosity component of the video segment may be of substantially higher practical value than the chromatic components. The video encoder 202 may therefore encode chromatic components at a lower resolution or quality level to prioritize the luminosity components and save bandwidth whenever desirable to compensate for poor network conditions. In a further embodiment, the chromatic components may be discarded by a video encoder 202 entirely and video processor 207 may perform color reconstruction using a machine learning system such as a neural network based entirely or in part on the information available in the luminance component of the video segment.

In an embodiment, each video encoder 202 may additionally first obtain an original frame from the camera 201 in a lower resolution, and then linearly rescale it to a higher resolution before encoding in order to emulate a gradual resolution change.

Figure 3:
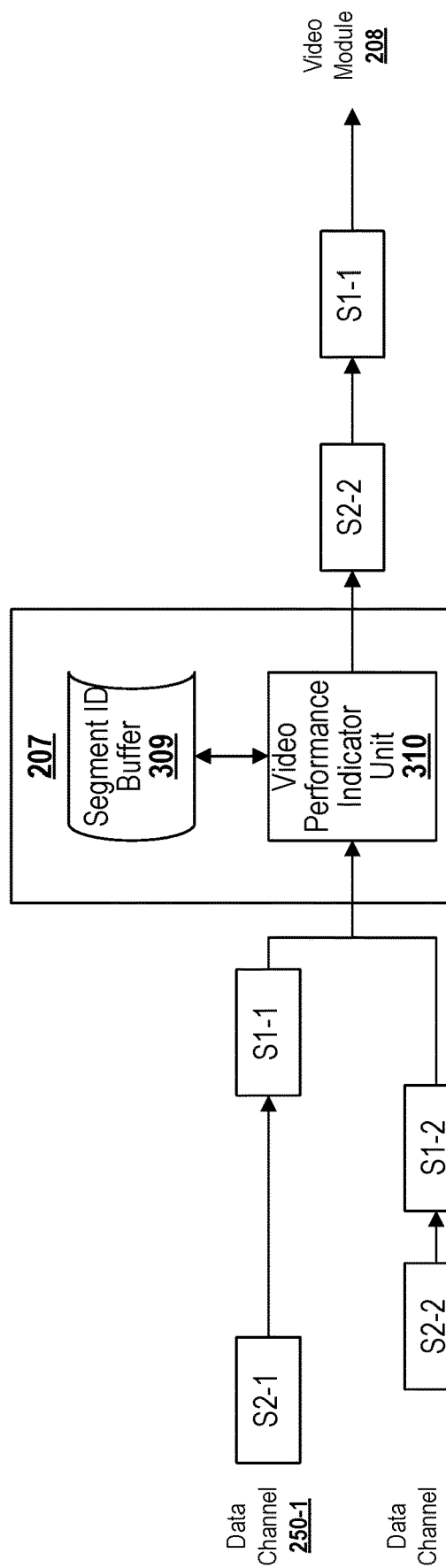
FIG. 3 is a diagram illustrating an example embodiment of a video processor for a video transmission system.

FIG. 3 illustrates an example embodiment of a video processor 207 and an example set of inputs and outputs. The video processor 207 may comprise a segment ID buffer 309 and a video performance indicator (VPI) unit 310 that evaluates individual video feed segments each comprising one or more frames to select between redundant segments received over the different data channels 250. The VPI unit 310 receives video segments and their respective identifiers (which may be assigned in numeric order or arbitrarily) and selects between corresponding video segments received from the different data channels 250 based on one or more selection criteria. For example, in one embodiment, the VPI unit 310 selects between corresponding segments based on the earliest arrival time. Here, the VPI unit 310 compares the identifier of each newly received video segment against a set of identifiers stored in the segment ID buffer 309 of identifiers of previously received video segments that have already been processed and sent to the video module 208. If the identifier of a newly received video segment is already present in the buffer 309, the VPI unit 310 discards the video segment. Otherwise, the VPI unit 310 sends the video segment to the video module 208 and stores the identifier to the buffer 309. For example, as illustrated in FIG. 3, the VPI unit 310 receives a first segment S1 of a captured video from each of the first data channel 250-1 (as S1-1) and the second data channel 250-2 (as S1-2). Upon arrival of each segment, the video performance indicator unit 310 determines if the first segment identifier S1 is already in the segment ID buffer 309. In the illustrated example, the segment S1-1 from the data channel 250-1 arrives first. The VPI unit 310 recognizes that the segment identifier F1 is not yet in the segment ID buffer 309. The VPI unit 310 then sends the segment S1-1 to the video module 208 and stores the segment identifier S1 to the segment ID buffer 309. Upon later arrival of the segment S1-2 from the data channel 250-2, the VPI unit 310 determines that the segment identifier S1 is already stored in the buffer 309 and thus discards the redundant segment S1-2. For the next segment, S2, the segment S2-2 arrives first from the data channel 250-2. Thus, in this case, the earlier arriving segment S2-2 gets passed to the video module 208 while the later arriving segment S2-1 gets discarded. In this manner, only the first received version of the segment S1 is sent to the video module 208 and the other segment is discarded.

In the example above, different length video segments may be used in different embodiments. In some embodiments, each segment may comprise a single frame and thus the VPI unit 310 may select between the different channels 250 on a frame-by-frame basis. In other embodiments, the segments may each comprise fixed-length or variable length segments comprising multiple frames.

In some embodiments, a video segment may comprise a heterogeneous sequence of frames or a sequence of interdependent frames. For example, a video segment may comprise key frames which contain sufficient information for decoding, and delta frames which additionally utilize information in the most recent key frame and may additionally utilize information in delta frames succeeding the most recent key frame and preceding the current delta frame for decoding. In the case of video segments having interdependent frames, the techniques described herein can apply to individual key frames or sequences or segments including delta frames together with additional frames utilized in decoding.

In another embodiment, in which the segment identifiers are assigned in sequentially increasing order, the segment ID buffer 309 may maintain the maximum identifier number $ID_{max}$ among segments propagated to the video module 208 without necessarily storing every segment identifier. If a newly received segment possesses an identifier $ID_n \leq ID_{max}$, the VPI unit 310 may determine that the segment has already been received and discard it. Otherwise, if a received segment has an identifier $ID_n > ID_{max}$, the VPI unit 310 may update $ID_{max}$ in the segment ID buffer 309 and propagate the received from to the video module 208.

In another embodiment, the video processor 207 may instead select between corresponding segments (having the same original segment identifier) from the different data channels 250 based on characteristics other than their arrival times. For example, the video processor 207 may maintain a video performance indicator (VPI) representing a quality index for each video feed computed over one or more segments or a certain duration of time, and select the video feed to be sent to the video module 208 based on the respective VPIs for each feed. For example, a first video feed from a first data channel 250-1 may initially be set as the active video feed to be propagated to the video module 208 based on the video feed from the first data channel 250-1 having a higher VPI than the second video feed from the second data channel 250-2. However, at a later time, the VPI unit 310 may determine that the VPI of the second video feed from the second data channel 250-2 becomes higher than the VPI of the first video feed from the first data channel 250-1. The VPI unit 310 then switches the active video feed to the second video feed from the second data channel 250-2 and begins propagating the video feed to the video module 208.

In another embodiment, the video processor 207 establishes an additive or a multiplicative threshold k that operates as a parameter controlling switching frequency of switching between video feeds from different data channels 250. For example, if a video feed from data channel 250-2 is currently active and has a VPI of $B_{VPI}(t)$ at a time t, the video processor 207 may switch to make the video feed from data channel 250-1 active only responsive to the video feed from data channel 250-1 obtaining a VPI value of $k \cdot B_{VPI}(t)$ for a minimum duration of $\Delta t$ or a minimum number of frames N. Such an embodiment may be useful in situations where both wireless networks used possess nearly identical or highly variable characteristics, and the video processor 207 would otherwise be frequently switching between video feeds. Such an embodiment may also be useful to allow time for the buffer bloat that may have accumulated on the previously inactive video feed connection to dissipate.

In one embodiment, the VPI unit 310 may process various other parameters to determine which video feed or segment to select. For example, the VPI unit 310 may base the decision on additional parameters such as the network round-trip time, mean resolution of the last N frames, mean interframe time delta over the last N frames, mean resolution of the last N frames, image naturalness metrics, signal-to-noise ratio, structural similarity indices, standard deviations of these characteristics, or any combination thereof. Here, the VPI unit 310 may penalize video feeds with highly variable resolution or interframe delays such that it is more likely to select the more reliable feed in the absence of other distinguishing parameters.

In an embodiment, the VPI unit 310 may maintain one or more video segment buffers (not shown) that stores received video segments. The VPI unit 310 assesses the values of the above-described parameters associated with the video segments over the duration of a desired time interval. For example, such an approach may allow the VPI unit 310 to select a video feed providing better visual quality at a cost of introducing latency overhead equal to or longer than the size of the video segment buffer.

In an embodiment, the VPI unit 310 may compute statistical values over an n-size sample from an N-sized array of the most recent frames, where n≤N. For example, the sample may be selected using a uniform random distribution function, or it may be selected prioritizing key frames over frames using interframe predictions.

In an embodiment, the video processor 207 additionally comprises an API for a user interface (UI) element allowing a remote human operator or artificial intelligence agent to select the desired video feed and override any automated decision-making process. For example, such a UI element may comprise a gesture-tracking system, a hardware button, or a touch-based on-screen switch, or an interface for an artificial intelligence agent.

Figure 4:
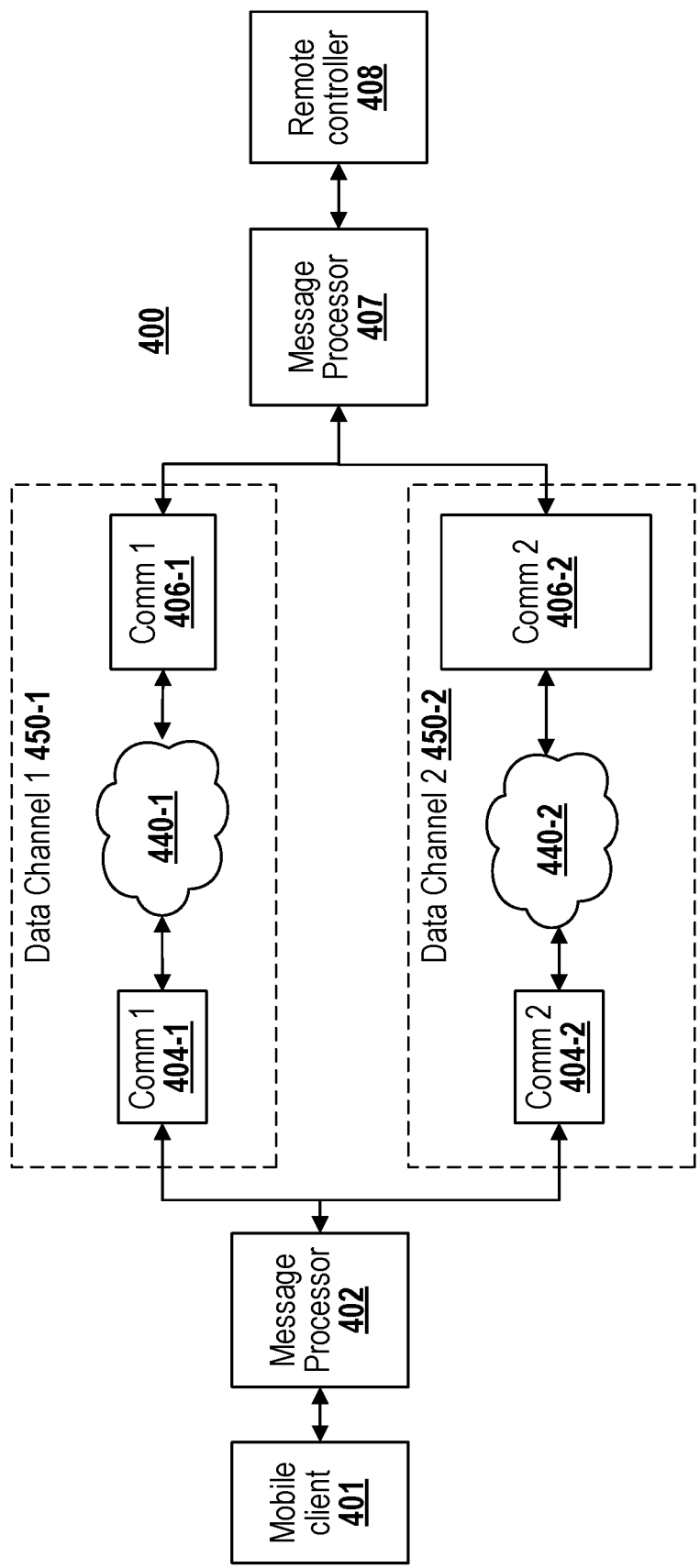
FIG. 4 is a diagram illustrating an example architecture of a dual-link message transmission system.

FIG. 4 illustrates an example of a communication system 400 for serving bidirectional message streams between a mobile client 401 and a cloud-based controller 408. Here, the mobile client 401 may be embodied in a vehicle 102 that may stream telemetry data and the remote controller 406 may be embodied in a remote support server 120 that provides remote support to the vehicle 102 via a messaging interface. Messages passed in one direction (e.g., from the mobile client 401 to the remote controller 406) may represent sensor readings, hardware health, actuator feedback and other types of telemetry. Messages passed in the opposite direction (e.g., from the remote controller 406 to the mobile client 401) may represent a command control channel for transmitting command packets or data queries. In other applications, the mobile client 401 may comprise a connected robot, and the remote controller 408 may comprise a cloud-based controller application.

Responsive to receiving a message from the mobile client 401 for transmission to the remote controller 408, a message processor 402 duplicates the message and provides the redundant messages to respective communication units 404 together with a message identifier for the message. The identifiers may be randomly assigned or may follow a numerical sequence. Messages with redundant data are assigned the same message identifiers. The communication units 404 each transmit the respective received messages over respective networks 440 that are received by separate communication units 406 as described above. The communication units 404 may operate, for example, by setting up routing tables for different physical interfaces on the mobile client 401. The received messages are de-duplicated by the message processor 407 by selecting between the received messages from the different data channels 450. The message processor 407 may select between the messages based on time-of-arrival, quality, or other parameters using any of the techniques described above. For example, the message processor 407 may extract message identifiers and maintain a database thereof similar to the example of FIG. 2 described above. Responsive to receiving a new message, the message processor 407 determines if the message identifier is present in the database. Responsive to a message identifier being present in the message identifier database, the message processor 407 discards the respective message as a duplicate. Otherwise the message is provided to the remote controller 408. A similar operation may be applied to send messages in the reverse direction from the remote controller 408 to the mobile client 401.

In an embodiment, the message processors 402, 407 may assign sequentially growing numerical identifiers to messages being transmitted, with redundant messages being assigned identical identifiers. The message processors 402, 407 may each maintain the maximum identifier number $ID_{max}$ in a message buffer among messages propagated to the respective sink terminals (either the mobile client 401 or remote controller 408). Responsive to receiving a message possessing an identifier $ID_n \leq ID_{max}$, a message processor 402, 407 discards the message.

In an embodiment, the message processors 402, 407 may instead assign randomly generated identifiers to messages, with redundant messages being assigned identical identifiers. The message processors 402, 407 may maintain lists, unordered sets, ring buffers or other data structures of recently received message identifiers. Responsive to receiving a new message, a message processor 402, 407 determines its identifier and searches for it in the respective list. Responsive to locating the message identifier in the list $ID_n \in \{ID_1, \ldots, ID_n\}$, the message processor 402, 407 discards the message.

Figure 5:
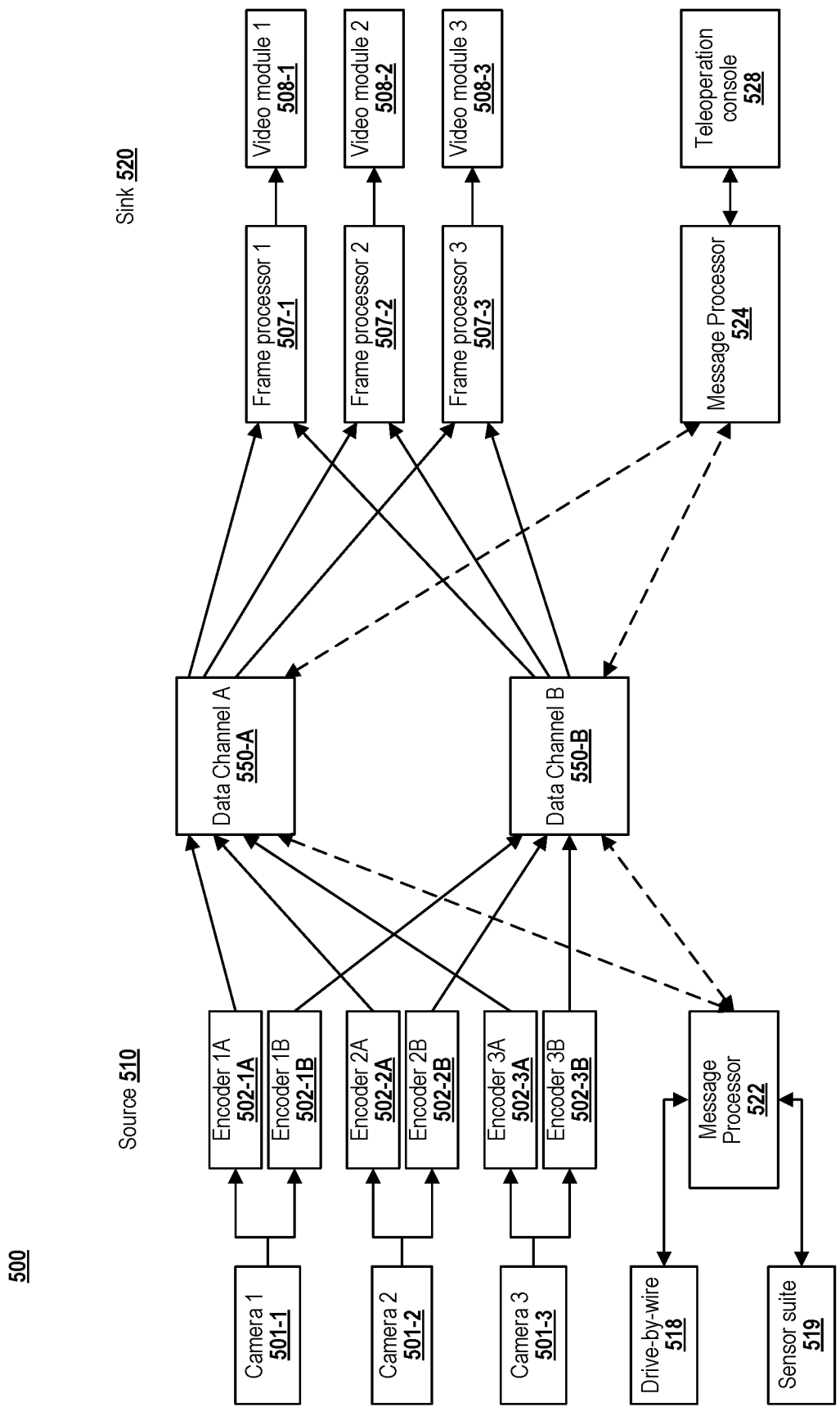
FIG. 5 is a diagram illustrating an example architecture of a dual-link multimedia transmission system.

FIG. 5 illustrates another example of communication system 500 that may be employed in teleoperation or cloud robotics applications. In this example, a source 510 is equipped with at least three cameras 501 that each stream respective video feeds into a pair of video encoders 502 (i.e., two video encoders 502 per camera 501). All of the encoders 502 operate independently of each other. Encoders 502-1A, 502-2A, 502-3A are configured to stream their respective outputs over a first data channel 550-A (which may include a network and communication units of the source 510 and sink 520 as described in FIGS. 2-4), and encoders 502-1B, 502-2B, 502-3B are configured to stream their respective outputs over a second data channel 550-B that may operate with different performance characteristics under different circumstances than the first data channel 550-A. The encoders 502 may each adjust their respective encoding quality, frame type composition, and other parameters according to network feedback and measured performance as described above. At the sink 520, the video processors 507 each receive a pair of video feeds, one from each of the data channels 550. The video processors 507 process their respective complementary video feeds in the manner described above to selectively output one of the two redundant video segments based on time-of-arrival, quality, or other selection parameter. The video processors 507 then supply the selected outputs to the respective visual modules 508 for rendering or other processing.

In this example, the source 510 is further equipped with a drive-by-wire system 518 and the sensor suite 519. A message processor 522 received messages from the drive-by-wire system 518 and sensor suite 519 for sending to the teleoperation console 528 at the sink 520. The message processor 522 duplicates the messages and provides the redundant messages to the respective data channels 550 which each transmit the messages to the message processor 524 at the sink 520. The message processor 524 selects between the messages as described above, and provides the selected message to the teleoperation console 528. The teleoperation console 528 may provide messages to the drive-by-wire system 518 and/or the sensor suite 519 (e.g., including control commands or other data) by sending in messages in the reverse direction in a similar manner.

In an embodiment, each set of encoders 502 associated with a given camera 501 may comprise different encoding formats such as AV1, H.264 or VP8 and/or operate according to different encoding parameters. For example, encoders 502-1A, 502-2A, 502-3A may use one encoding format and/or set of encoding parameters while encoders 502-1B, 502-2B, 502-3B may utilize a different encoding format and/or encoding parameters). Each video feed may then be encoded by a plurality of encoders 502 with different encoding formats or encoding parameters for transmission to the sink 520 which may affect transmission performance. The video processors 507 selects between the redundant video feeds as described above.

Figure 6:
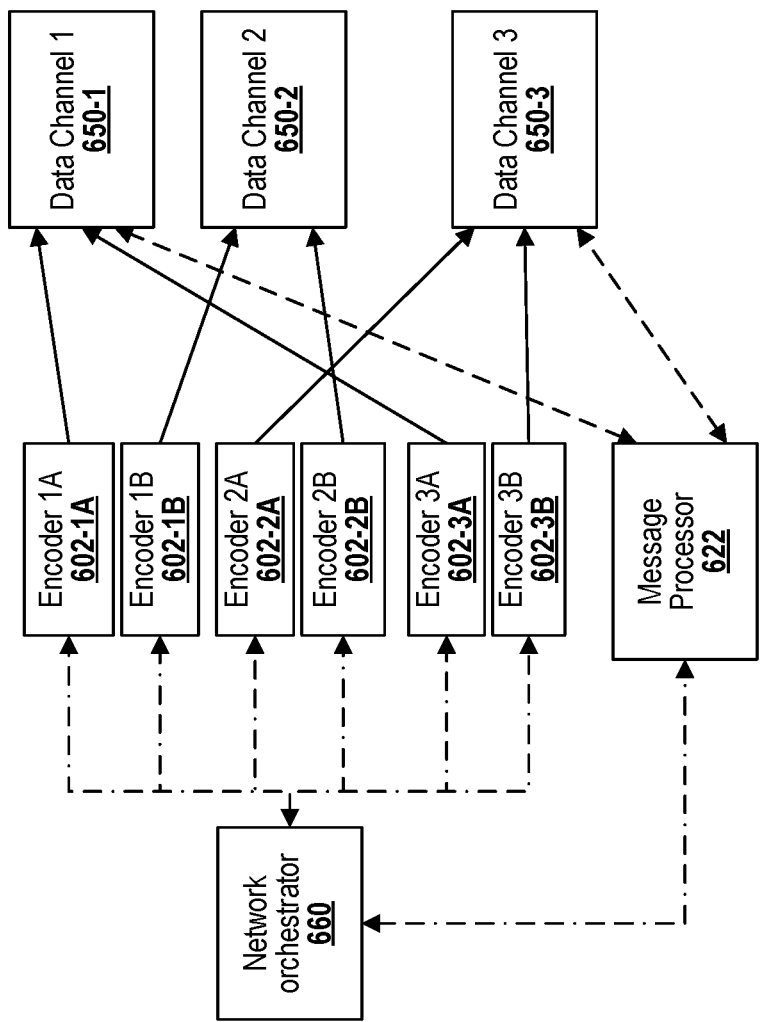
FIG. 6 is a diagram illustrating an example architecture of a multi-link multimedia transmission system.

FIG. 6 illustrates another embodiment of a communication system 600 that comprises a network orchestrator 660 linked to a plurality of video encoders 602 and a message processor 611. The data sources (e.g., cameras or messaging sources) are omitted from FIG. 6 for conciseness. The orchestrator 660 collects feedback from the video encoders 602 and message processor 622 and assigns the encoders 602 and the message processor 622 to available data channels 650 based on the feedback in accordance with some optimization criterion. The orchestrator 660 may furthermore adjust quality factors associated with the transmitted data based on the feedback. Generally, the orchestrator 660 may generate assignments such that any given output from one of the encoders 602 and message processor 611 is assigned to two more data channels 650 involving different networks and/or networking parameters. In determining these assignments, the orchestrator 660 may discard possible assignment solutions that involve redundant data feeds being assigned to a common data channel 650 to maintain the effectiveness of data channel redundancy. For example, the orchestrator 660 may operate to ensure that outputs of encoders 602-1A, 602-1B that encode the same video frames from the same camera are assigned to different data channels 650 but may allow encoded video different cameras to be transmitted over the same data channel 650. In an embodiment, the orchestrator 660 may acquire network connection parameters and determine the encoding parameters for each video feed encoder. The orchestrator 660 may then perform an optimization algorithm to determine the distribution of encoded video feed streams among the available data channels 650 in a manner that minimizes the total unused bandwidth while maintaining the low latency and smooth playback of the data streams.

In an embodiment, the orchestrator 660 maintains three or more data channel assignments for one or more data sources. Such an approach allows the orchestrator 660 to increase redundancy and reliability of critically important data streams at the expense of bandwidth available for allocation to secondary data streams.

In an embodiment, the orchestrator 660 may statically (e.g. during initialization) or dynamically (e.g. during operation) set the redundancy level for individual data sources or data source groups. The orchestrator 660 may additionally comprise an API permitting control over redundancy level to an external decision-making process, including both automation and human intervention.

In an embodiment, the orchestrator 660 executes a search process in the space of configuration states described hereinafter. The search process may use an applicable state of the art search algorithm such as A*, D*, greedy depth-first search or Dijkstra's algorithm, or other algorithm. The orchestrator 660 additionally may communicate the solution in full or in part to the encoders 602 or message processor 622, which may then reroute their traffic flows through the appropriate data channels 650 that may each transmit over different networks and/or utilize different network parameters. The orchestrator 660 may repeat the search process on a regular basis or on triggering of certain events.

In an embodiment, the orchestrator 660 represents the edges of the graph comprising the space of configuration states reachable from a particular state by specific actions that may be taken by the orchestrator 660, the encoders 602, or message processor 622. As an example, such actions may include a null assignment of video data to a data channel 650 to effectively stop the video feed, or changing the video feed resolution.

In an embodiment, the orchestrator 660 represents a state of the communication system 600 possessing 2n dually redundant data channels and k data channels 650 with a 2n length vector of base (k+1) numbers. Vector element values determine the identifier of the assigned data channel 650. The additional degree of freedom corresponds to the option of assigning an output to a null data channel, i.e. stopping its streaming.

In an embodiment, the state of the communication system 600 additionally includes a 2n length vector determining the quality property of each data stream. For example, an element describing the quality level of a video stream may determine the currently set resolution of the camera video feed.

In an embodiment, the total cost function of a state is comprised of two addends $f(s)=g(s)+h(s)$. The first addend $g(s)$ represents costs incurred by a chosen action (such as reassigning a data stream to a different network or changing its quality factor), while the second addend $h(s)$ represents the heuristic function used to rank candidate states.

In an embodiment, the orchestrator 660 computes the heuristic function in the following manner. Let P be the value of a penalty applied to the data stream i in the state s:

$$P_i(s) = B_i^{max} - B(i,s)^{exp}$$

Here $B_i^{max}$ is the practical maximum bandwidth that may be consumed by the data stream i, and $B(i, s)^{exp}$ is the empirically measured bandwidth as provided by the data stream producer. Let S(j, s) be the total penalty incurred on the data channel j to which m data streams are assigned in the state s: $S(j,s) = \sum_{i=1}^{m} P_i(s)$. The total penalty incurred on the null data channel may be computed as $S(j, s) = \sum_{i=1}^{m} B_i^{max}$. The heuristic function is then introduced as $h(s) = \sum_{j=1}^{k} S(j, s)$; in other words, the heuristic function represents the total bandwidth deficit to which the active data streams are subjected.

In an embodiment, the orchestrator 660 computes the heuristic function $h(s_{d+1})$ of an open state $s_{d+1}$ at the depth level d+1 in a differential manner based on the value of the heuristic function $h(s_d)$ corresponding to the original state $s_d$ at the depth level d to which the state $s_{d+1}$ is immediately connected with a single action affecting the data stream i: $h(s_{d+1}) = h(s_d) - P_i(s_d) + P_i(s_{d+1})$. This may allow reduction of the complexity of the heuristic function calculation to O(1).

In an embodiment, the orchestrator 660 constructs and updates the state graph episodically, periodically or in substantial real-time according to the availability of experimental data acquired by a mobile client or a plurality thereof. For example, a version of the state graph may define a state $s_i(L, M, C)$ as a data point including the mobile client localization vector comprised of mobile client position, speed, heading and steering angle $L = \{x, y, v, \phi, \theta\}$ or a subset thereof, the map of data stream assignment to communication devices $M = \{r_{ij} \rightarrow d_k \; k \in [0, m], i \in [1, n], j \in [1,2]\}$, and an array determining data stream configurations $C = \{c_i \; i \in [1, n]\}$. The real-world environment may involve other complex dependencies, and thus the true state $s_i$ may additionally depend on a list of hidden variables $H = \{h_1, h_2 \ldots, h_z\}$, which may be classified as known unknown variables and unknown unknown variables. Subsequently, the orchestrator 660 does not distinguish in advance between a set of states $\{s_{ij}(L, M, C, H_j) \; j \in J\}$ comprised of identical vectors aside from the hidden variable vectors $H_j$. The orchestrator 660 is thus capable of distinguishing between the states $\{s_{ij} \; j \in J\}$ post-factum by applying an action Q or a sequence thereof, as otherwise the states can be practically considered a single state. Therefore, in an embodiment, the state graph may be updated by performing posterior analysis of the observed penalties and constructing the sets of states $\{s_{ij}(L, M, C, H_j) \; j \in J\}$ for all directly observable state identifiers $i \in I$. Penalties associated with such ambiguous states may be computed as the mathematical expectation of the penalty according to measured probabilities of each state. Alternatively, the state graph may be represented with a hidden Markov model. In an embodiment, filtration of non-persistent features of state graph may be performed episodically or periodically to remove states that are not observed sufficiently often and are similar enough to some other states to be merged with them. With this approach, the search algorithm performance will be improved, which may be important for a solution that is required to execute in substantial real time. To perform the filtration, techniques such as persistent homology may be used, allowing to investigate graph structure at various cut-off weight thresholds.

In an embodiment, the $B_i^{max}$ values used to evaluate penalties may comprise dynamic variables depending on the geographical coordinates of the source or an equivalent positioning vector, and a vector T comprised of the time since Epoch modulo durations representing periods of diurnal, annual, or other variations, or an equivalent representation of the local time and the day of the year.

In an embodiment, the orchestrator 660 may artificially limit the total number of opened states or the search depth level for performance considerations. For example, the orchestrator 660 may impose the search depth limit manually and statically, or in a periodic manner based on the current CPU load. In this case the orchestrator 660 uses the state with the best heuristic function value seen during the search procedure as the search result.

In an embodiment, the orchestrator 660 may impose penalties on individual data channels in order to restrict bandwidth consumption. Exact penalization mechanisms may vary; for example, a video channel may be penalized by limiting the maximum permitted resolution, and an audio channel may be penalized by allowing a higher ratio of dropped frames.

In an embodiment, the orchestrator 660 may restrict the solution space to a subset of states where the ratio of penalty values for any pair of redundant data channels is limited by a predefined interval.

In an embodiment, each video encoder 602 publishes the estimate of the available bandwidth and other relevant channel metadata in substantially real time for consumption by the orchestrator 660 or, optionally, other functional units of the communication system 600. The orchestrator 660 subscribes to metadata updates published by all encoders 602; responsive to obtaining a metadata update the orchestrator 660 may subsequently include the changes into aggregated metadata, assess the current available bandwidth for each wireless network, and perform the search procedure to maximize the network utilization and reduce congestion.

In an embodiment, the orchestrator 660 performs metadata aggregation and solution search procedure on a regular basis by polling some or all encoders 602 for the current values of metadata variables, rebuilding the aggregate metadata array and performing the search procedure. The interval at which the orchestrator 660 repeats this cycle may be adjusted depending on decisions produced by a higher order governor unit. For example, a contentious dynamic network environment used by multiple highly mobile clients may require a more frequent cycle to allow for optimal use of resources compared to a sparsely populated network environment with gradually changing characteristics.

In an embodiment, the orchestrator 660 determines the cost function in part using a priority coefficient manually or programmatically assigned to each data or video stream. In the example case of the mobile client represented by a remotely operated vehicle, the highest priority coefficient may be assigned to the fore camera, the second highest to the command and telemetry channel, and then in diminishing order to side camera feeds, rear camera feeds, and audio streams.

In an embodiment, the orchestrator 660 additionally comprises a high-order governor unit which manipulates the priority values depending on the environment and the current task being executed by the mobile client. In the example case of the mobile client represented by a remotely operated vehicle, during an operation that requires a lot of parking maneuvers the orchestrator 660 may assign higher priority to the rear camera feeds when the vehicle is driving in reverse gear.

In an embodiment, the orchestrator 660 may use the priority coefficient as an additive or multiplicative factor determining the bandwidth penalty a data channel is allowed to incur in case of shortage of bandwidth. Subsequently, information feeds of lower priority would be penalized more severely to preserve uncongested network operation. For example, the fore camera video feed may be assigned a higher priority coefficient than side camera feeds, ensuring that its bandwidth consumption is regulated less aggressively. As a second example, a data channel 650 dedicated to transmission of safety-critical commands such as braking orders may be assigned a specially encoded infinite priority value to prevent the system from attempting to regulate that data channel 650 in any manner.

In an embodiment, the orchestrator 660 in part determines the cost function using a penalization order sequence to prevent penalization of a data stream until one or more practically less important data streams have been penalized to the maximum extent permitted by their priority coefficients.

In an embodiment, the orchestrator 660 in part determines the cost function using the specific penalization currently applied to a channel and the difference between its current penalization level and the prospective penalization level in the candidate solution. In other words, the heuristic may favor a layout modification that among two complementary data channels would benefit the one that is currently more penalized.

In an embodiment, the orchestrator 660 in part determines the cost function using the specific penalization currently applied to a channel in a non-linear manner such as via a logistical function, with its shape and parameters being chosen according to the specific minimum requirements of available data channels 650. Such an implementation may be useful to prevent individual data channels from being starved out of bandwidth by high-priority ones.

Figure 7:
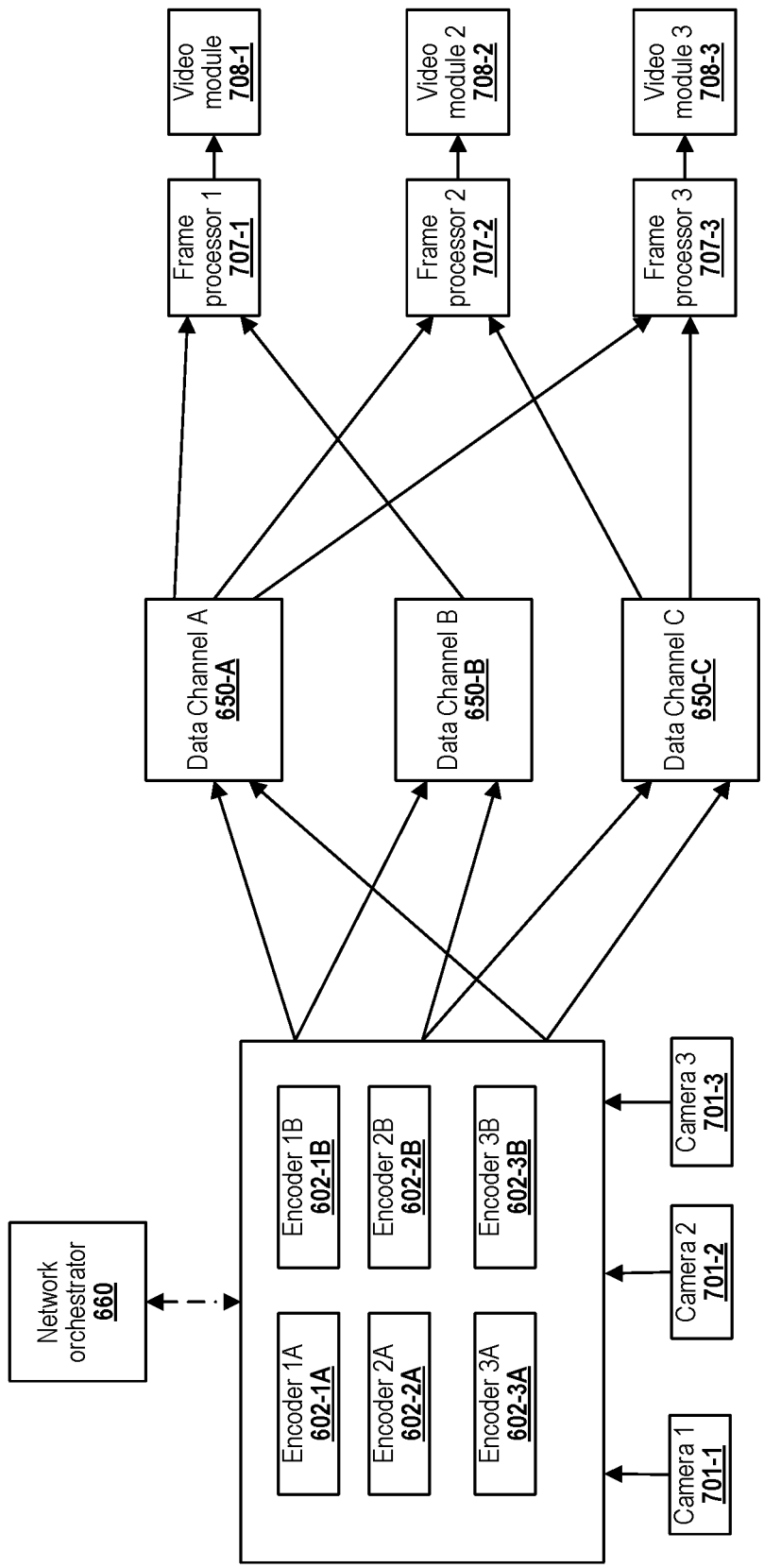
FIG. 7 is a diagram illustrating an example architecture of a multi-link orchestrated multimedia transmission system.

FIG. 7 illustrates an example of an enhanced video communication system 700. Here, the orchestrator 660 manages video streams from cameras 701. The encoders 602 encode mutually complementary (e.g., redundant) streams to which the orchestrator 660 assigns to data channels 650 using any of the above-described techniques. The video processors 707 evaluate the received video data and output selected segments to the video modules 708 using any of the above-described techniques. In an embodiment, the video processors 707 maintain and update a ranking of each version of the video feed in substantially real time, provide segments from the high-ranking version of each feed to the video consumer for further processing, and discard segments from the low-ranking version of each feed. The orchestrator 660 may furthermore update the assignments based on monitored network parameters. For example, responsive to detection of deteriorating performance of a network associated with a data channel 650-C and improving performance of network associated with a data channel 650-B, the network orchestrator 660 may determine to detach the stream generated by the camera 701-3 from the data channel 650-C and processed by the encoder 602-3B and re-assign it to data channel 650-B instead.

In an embodiment, the network orchestrator 660 switches an inactive video stream assigned to a null network to a low-bitrate mode by instructing a respective encoder 602 to reduce the video feed resolution or quantization parameter (QP) instead of completely suspending transmission. In such an embodiment, the inactive video stream is maintained as a backup feed available immediately in case of a failure affecting the primary video stream at the cost of computational resources utilized to continue encoding and decoding the video feed. Responsive to the failure of the active video feed and activation of the backup video feed the orchestrator 660 may instruct a respective encoder 602 to maintain the bitrate of the backup video feed or increase it depending on the wireless network performance.

In an embodiment, the network orchestrator 660 transforms an inactive video stream into a probe stream by instructing a respective encoder 602 to strip the payload data from the respective network packets, and optionally mark them as dummy packets. In such an embodiment the respective communications units associated with the data channels 650 may use an inactive video stream for collecting high-frequency wireless network metrics while conserving bandwidth consumption.

In a further embodiment, the video encoders 602 strip payload data from delta frames but transmit key frames normally, or transmit short bursts of key frames and delta frames normally but strip the payload from most packets, or use another method of mixing probe and payload packets. Such an embodiment may allow the system to improve the network assessment quality, calibrate the respective encoders 602 to true network conditions, and to prevent upstream network routers (e.g., controlled by cellular carrier or WiFi administrators) from marking a video stream as low-bitrate and restricting potentially available bandwidth.

In a further embodiment, a video processor 707 builds the output video feed by filtering dummy packets from the mutually complementary streams.

In a further embodiment, responsive to the network orchestrator 660 activating a video stream, a video encoder 602 gradually increases the bitrate of the video stream by manipulating the payload-to-dummy ratio (PDR), resolution (WXH) or QP.

In an embodiment, the system aims for Pareto-optimality of QP, resolution and PDR. Pareto-optimality in this case is interpreted as a condition whereas a quality metric (QM) of the video feed cannot be improved under the given bitrate constraints by improving one or more of the tracked parameters without detrimentally affecting one or more other tracked parameters. For example, a video encoder setting described by a (WXH, QP, PDR) triplet that produces a video feed possessing the maximum QM value of video feeds produced by all encoder settings at a given bitrate restriction is considered to be Pareto-optimal. Other video encoder settings may be used to define the Pareto optimality frontier.

In an embodiment, the system may additionally implement roaming in scenarios where such are not provided by the available wireless connectivity environment. One or more communications units of the data channels 650 are allocated to probing available WiFi, cellular or other spatially distributed wireless access nodes. Responsive to detection of a wireless access node possessing better connection quality metrics than one of the currently utilized wireless access nodes and determination with a high degree of confidence that the current trajectory of source 600 represented by a mobile unit is not likely to lead to its performance degradation within a desired time interval, the network orchestrator 660 may proactively reassign an inactive video feed to that wireless access node.

In a further embodiment, probing of available WiFi nodes may be performed using one or more underutilized communication units 204 or by communication units 204 serving inactive video feeds.

Figure 8:
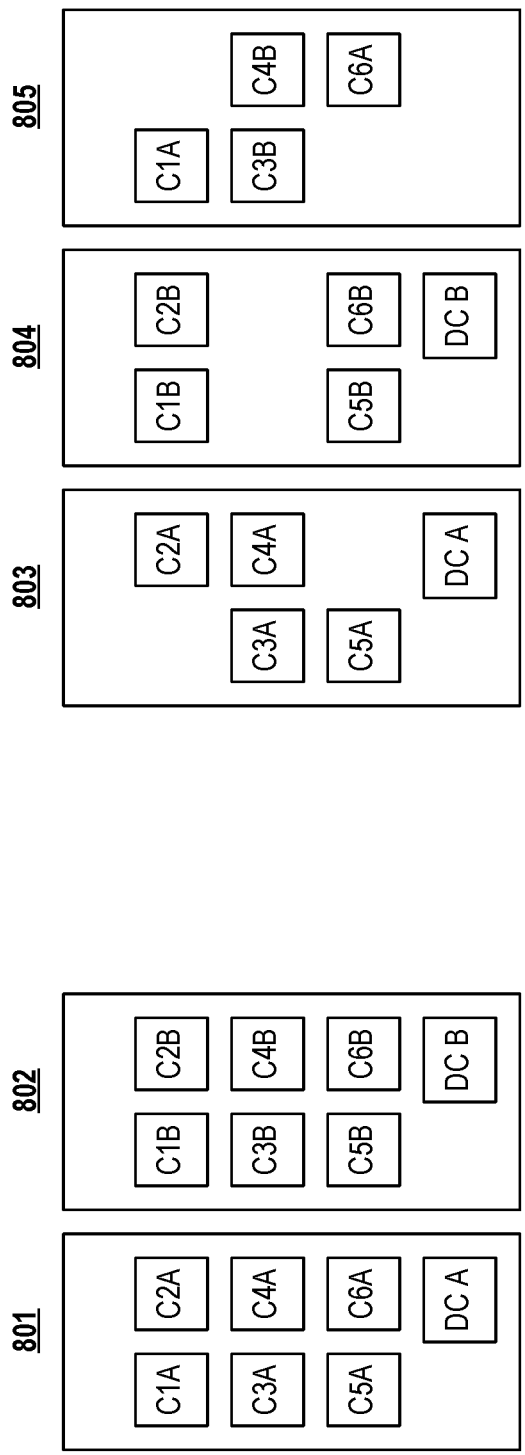
FIG. 8 is an illustration of example embodiments of a multi-link orchestrated system.

FIG. 8 illustrates examples of possible solution spaces for an orchestrator 660 that orchestrates assignment of complementary data streams to two possible data communication channels 801, 802. In the example of FIG. 8, the data streams include the following complementary data stream pairs where each pair represents a set of redundant video streams: {C1A, C1B}, {C2A, C2B}, {C3A, C3B}, {C4A, C4B}, {C5A, C5B}, {C6A, C6B} and a set of redundant data streams {DCA, DCB}. The solution space enforces assignment of streams within the same complementary pair to different data channels 801, 802. Under these constraints, the solution space comprises 128 homomorphic solutions, of which one example solution is illustrated in FIG. 6. In another example, an orchestrator 660 may assign a set of complementary data streams to three or more different data channels 801, 802 under the same constraint that the streams within the same complementary pair are assigned to different data channels. In the illustrated example, the same set of complementary data stream pairs specified above are assigned between three data communication channels 803, 804, 805. In this case, the candidate space for distributing video and data channels between data communication channels 803, 804, 805 comprises 279,936 homomorphic solutions on which one is illustrated. In a more general system having a different number of complementary data stream pairs and data communication channels, the number of possible solutions is $k^n(k-1)^n$ where n is the number of data stream pairs and k is the number of data communication channels available. In yet further examples, an orchestrator 660 may orchestrate assignment of data streams that are triple redundant or have even higher redundancy between an arbitrary number of data communication channels using similar techniques those described above.

Figure 9:
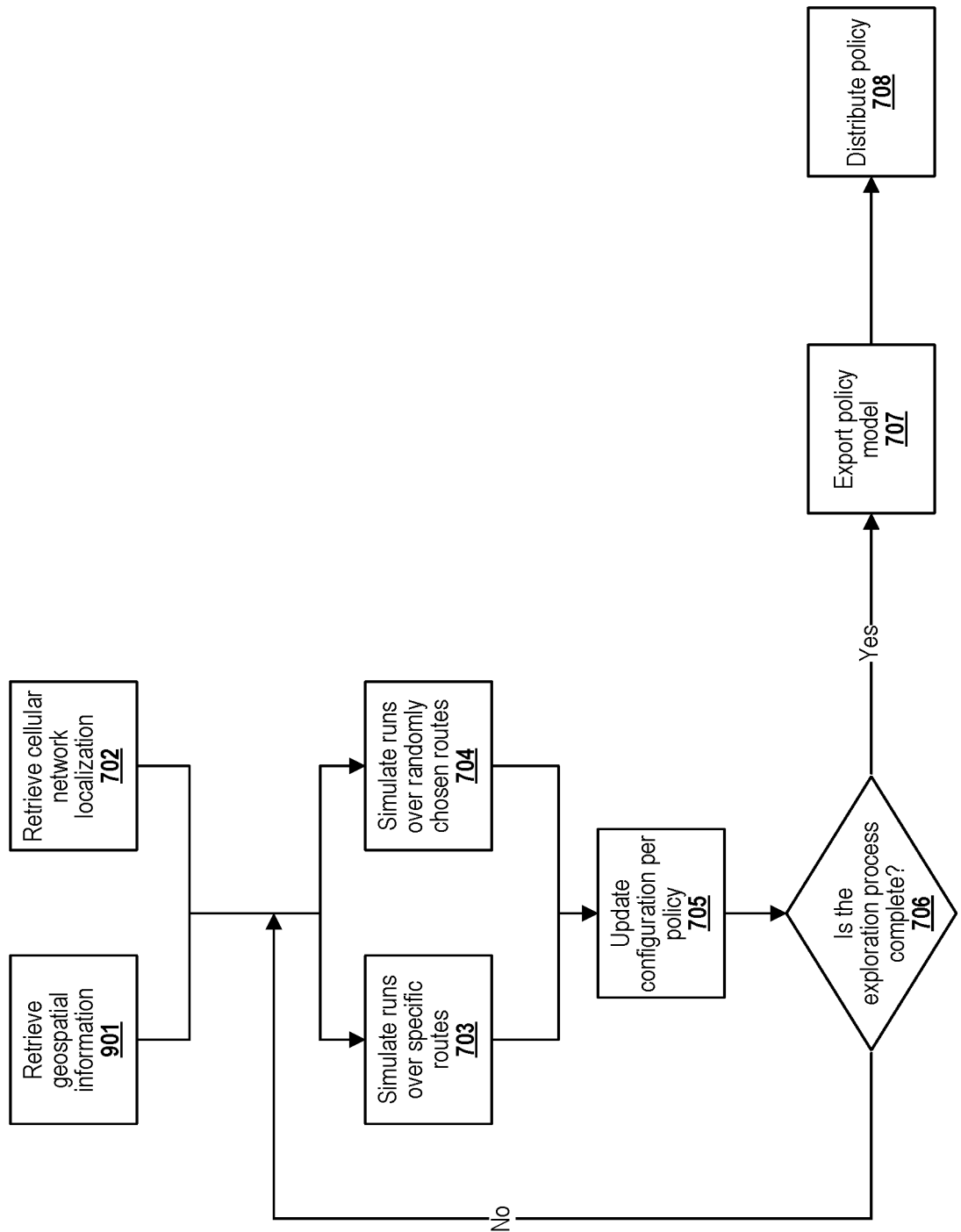
FIG. 9 is a flowchart illustrating an example workflow for orchestrator training based on reinforcement learning.

FIG. 9 illustrates an example embodiment of a process performed by a simulation suite to model network performance, generate policy for orchestrators 660 based on the modeled network performance, and distribute the policy. In an embodiment, the method may partially comprise a reinforcement learning approach, where the orchestrator 660 is initially trained on a dataset collected using a wireless environment and the urban traffic model simulation suite. For example, the simulation suite may operate on a model of a vehicle 102 or other source equipped with a plurality of communication devices $D=\{d_1, d_2, \ldots, d_m\}$ and a plurality of egress data stream generators $G=\{g_1, g_2, \ldots, g_n\}$ producing mutually complementary streams $R=\{r_{11}, r_{12}, \ldots, r_{n1}, r_{n2}\}$ controlled by the corresponding configuration variable sets $C=\{c_{11}, c_{12}, \ldots c_{n1}, c_{n2}\}$. The simulation suite may involve, for example, the SUMO traffic simulator, LENA/ns-3 LTE network simulator, and the NS2Mobility middleware package, or any appropriate alternatives thereof. The simulator retrieves 901 geospatial information including positions and shapes of obstacles such as hills and buildings in an environment. The simulator furthermore retrieves 902 the location, orientation and technical characteristics of cellular transmitter nodes or other network infrastructure, and instantiates a simulation using geospatial information representing the urban domain or other environment. The simulator then simulates 903 operation of the vehicle either over a plurality of specific routes (such as routes acquired from the database of routes previously traversed by an actual vehicle being simulated), and/or simulates 904 operation of the vehicle over a randomly chosen route for a substantial duration of time. The simulator may then update 905 a configuration of an orchestrator policy based on the simulated results. For example, the simulator may select an assignment schema of R→D and specific values for C in a manner determined by a comparison of an accepted exploration and an exploitation policy. The simulator determines 906 if the exploration process is complete. If it is not complete, the simulator repeats the simulation a sufficient number of times under a stopping criterion is met. Once the exploration process is complete, the simulator exports 907 a policy model. The policy model may comprise, for example, a tabular rule set or a trained neural network rule set for configuring and assigning data streams in each state corresponding to a road segment under investigation. For example, a state in such a simulation may be determined by the localization vector comprised of vehicle position, speed, heading and steering angle $\{x, y, v, \phi, \theta\}$ or a subset thereof, the map of data stream assignment to communication devices $\{r_{ij} \rightarrow d_k\ k \in [0, m], i \in [1, n], j \in [1, 2]\}$, and data stream configurations $\{c_i\ i \in [1, n]\}$. Furthermore, an action in such a simulation may be determined by the changes in data stream assignments and configurations: $Q=\{r_{ij} \rightarrow d_l;\ c_t\ \text{st.}\ i, t \in [1, n], k, l \in [0, m], j \in [1,2], k \neq l, i \neq t\}$. Performing an orchestrator action may be interpreted as altering the course of the ITS in the state space, potentially allowing it to reach a state $(S, Q) \Rightarrow S'$ is associated with the prospective vehicle localization vector and possessing a lower cost function compared to the state $(S, \emptyset)\ S''$. The cost function may be chosen as necessary; for example, it may be represented as $F(S, Q)=\Sigma_{i=1}^n (\max(\tau_{th}, \tau(S'))-\tau_{th}(S'))^2 + \Sigma_{i=1}^n \Sigma_{j=1}^2 B_{ij}^{max} - B_{ij}(S')^{sim}$ where $\tau$ is the total latency of an egress data stream and $\tau_{th}$ is the threshold of allowed latency that does not incur a penalty on the cost function.

In another embodiment, the simulation suite may involve other simulation software and data source classes to simulate WiFi signal propagation in indoors environments. For example, a simulation suite involving Omnet++ or MIMIC technologies and an environment built on an imported or procedurally generated dataset describing the geometry of a warehouse or a container yard may substitute the hereinbefore described simulation suite and perform an equivalent workflow in order to generate policies for orchestrators 660 operating on utility vehicles such as forklifts or pallet jacks deployed in an actual or a model warehouse.

In an embodiment, the simulator suite may additionally comprise simulations of specific or randomly generated urban traffic scenarios, and perform policy training for each desired urban traffic scenario, local time interval, or a cluster thereof.

In an embodiment, the vehicle localization vector may be additionally enriched by variables such as the time derivatives of the steering angle $\dot{\theta}$ and vehicle speed $\dot{v}$. For example, the orchestrator 660 may use this approach to react to actions performed by a teleoperator in advance.

In an embodiment, the cost function $F(S, Q)$ may be integrated over a time interval $\Delta t$ to account for the fact that orchestrator 660 actions are not instantaneous and possess a cooldown period, during which no new actions may be taken. From this, it follows that in an example, the orchestrator 660 configuration for a time interval where the vehicle may partly possess good wireless connectivity and partly be located in a radio shadow may be chosen according to the integral cost function in a risk-averse manner, i.e. sacrificing the additional bandwidth that may be obtained in the first part of the period in order to avoid incurring heavy penalties in the second part of the period.

In an embodiment, the constructed policy is comprised of a neural network possessing at least one hidden layer, where the input state is determined by the vehicle localization vector, data stream assignment to communication devices and data stream configurations, and the output layer is comprised of an $(2n-m) \times m$ mapping of complementary data streams to communication devices combined with the unrolled dense matrix of data stream configuration options.

The architecture of the neural network may be determined either manually or using the automated machine learning approach.

In an embodiment, the neural network training process is comprised of three stages. During the first stage, the neural network is trained regularly. During the second stage, pruning of the resulting neural network is performed. During the third stage, the training process is repeated using the pruned network architecture.

In an embodiment, the simulator suite distributes 908 the orchestrator policy to computational units to perform the actions onboard without requiring additional input from a remote machine intelligence agent. The simulator suite may update onboard policies episodically, periodically, or in substantial real time. The policy distribution process may involve either simultaneous transmission of a plurality of policy models produced for different scenarios, or on-demand transmission of the policy model determined as the currently most appropriate one. The policy selection process performed onboard the vehicle or at the remote server may utilize information acquired by the vehicle sensor suite, information acquired from third party data sources, or both.

In an embodiment, the simulation suite utilizes a generalized multi-layer wireless network environment representation possessing the desired set of characteristics to perform the required simulations, and does not involve traffic simulations. In this case the characteristics of wireless networks are present explicitly in the input vector of the policy model as opposed to being present implicitly as the product of the vehicle's localization vector and interference generated by other network clients present in the simulation.

In an embodiment, the simulation suite determines systematic simulation errors using a cross-verification procedure. For example, the simulation suite may initially use a plurality of network traces obtained from experimental results as a reference for establishing the time profile of network bandwidth bottleneck. During the cross-verification procedure, the simulation suite may replay the exact sequence of actions taken by a simulated orchestrator 660 during the recorded network trace, and the simulated data sources may replay the recorded data streams such as uncompressed video feeds for consumption by the encoders. The simulation suite may then use the root mean squared error of the recorded video encoder bit rates and the simulated video encoder bit rates or any other applicable metric over the time interval covered by the network trace to establish the systematic error, which may then be accounted for in future simulation runs.

In an embodiment, the simulation suite performs the training of the orchestrator 660 based on experimental results. For example, the simulation may involve a vehicle equipped with the full computational suite required by the system, a plurality of communication devices $D=\{d_1, d_2, \ldots, d_m\}$, and a plurality of egress data stream generators $G=\{g_1, g_2, \ldots, g_n\}$ producing mutually complementary streams $R=\{r_{11}, r_{12}, \ldots, r_{n1}, r_{n2}\}$ controlled by the corresponding configuration variable sets $C=\{c_{11}, c_{12}, \ldots, c_{n1}, c_{n2}\}$ is navigated by an in situ driver over a road network, with each road segment being traversed one or more times over the course of training. The simulated orchestrator 660 may use available information such as the vehicle localization vector and datasets acquired by prior mapping or by real-time monitoring to determine the current state as determined by the set of wireless network characteristics $W=\{w_1, w_2, \ldots, w_k\}$ to determine the current state S. The simulated orchestrator 660 may then select and apply an updated array of configuration variable sets C, measure and record the resulting cost function. The remainder of the learning process is similar to the one described hereinbefore.

In an embodiment, the collection of variables determining the state space may include spatial or spatiotemporal position of the vehicle P. For example, the position P may be determined in part by the current geographical coordinates of the vehicle, its current pluscode or H3 index at the desired resolution level, or the current local time.

In an embodiment, the collection of variables determining the state space may include both spatial or spatiotemporal position of the vehicle and the wireless network characteristics. Such an approach may allow the simulation suite to build a more comprehensive model reflecting a better tuned and nuanced state-action database.

In an embodiment, the simulation suite accounts for the differences in vehicle types during data accumulation process and orchestrator training. For example, the simulation suite may create and maintain distinct experimental or simulated data sets for each individual vehicle model supported to account for differences in driving experience for remote operators. Alternatively, the simulation suite may create and maintain experimental or simulated data sets for vehicle clusters possessing similar kinematic qualities or characteristics of the command and control response function. The specific criteria used to establish vehicle clusters may be chosen according to a desired objective function, according to operator feedback, or otherwise. Subsequently, an individual vehicle would have the orchestrator policy appropriate for its class loaded into its memory.

In a further embodiment, the simulation suite may perform vehicle model clustering episodically, periodically or in substantial real time depending on the chosen criteria. For example, a vehicle model may be transitioned from one cluster to another overriding the algorithmic selection by a qualifier supervisor based on feedback received from human operators. Alternatively, changes in wireless network characteristics, data stream encoding protocols or addition of new supported vehicle models may enable achieving a lower variance between optimal solutions and the unified cluster-wide solution.

In an embodiment, the model construction workflow involves a transfer learning or domain adaptation process to accelerate the production of orchestrator models by utilizing one model trained for a specific cluster as a basis for training models corresponding to other clusters or to an updated version of the original cluster. For example, a model corresponding to an vehicle cluster describing autonomous passenger cars may be transferred to a cluster describing delivery robots using state of the art techniques.

In an embodiment, the simulation suite may perform a dimensionality reduction procedure prior to conducting model training for each vehicle model cluster individually. For example, a policy model for delivery robots may be pruned of the vehicle speed variable, as the maximum speed attained by such vehicles is negligible compared to the adaptation capabilities of industry-standard communication devices.

In an embodiment, the simulation suite may partially comprise an expert-driven input module. For example, remote operators may provide feedback using any suitable interface or mechanism and rate road segments according to the vehicle operation difficulty level encountered. Such feedback may also be obtained independently by measuring physiological characteristics such as heart beat rate, eyeblink rate, skin conductance, eye pupil dilation or constriction, and limb motion deviation from standard models. This manually or semi-manually labeled data may subsequently be used as an input vector for the orchestrator policy neural network. This approach may account for interconnected factors affecting remote operator performance that may be difficult to correctly quantify and formalize.

In an embodiment, the simulation suite may additionally comprise a video feed quality assessment module, and use the output of that module as a part of the input vector for training the orchestrator neural network.

In an embodiment, the simulation suite may additionally comprise a video feed complexity assessment module to estimate the effort required on the part of a remote operator for correctly perceiving and comprehending the visual scene. For example, such a module may be built around a deep convolutional neural network trained to detect obstacles and a subsystem for estimation of obstacle kinematics. The output of such a module may be further used as a part of the input vector for training the orchestrator neural network.

Figure 10:
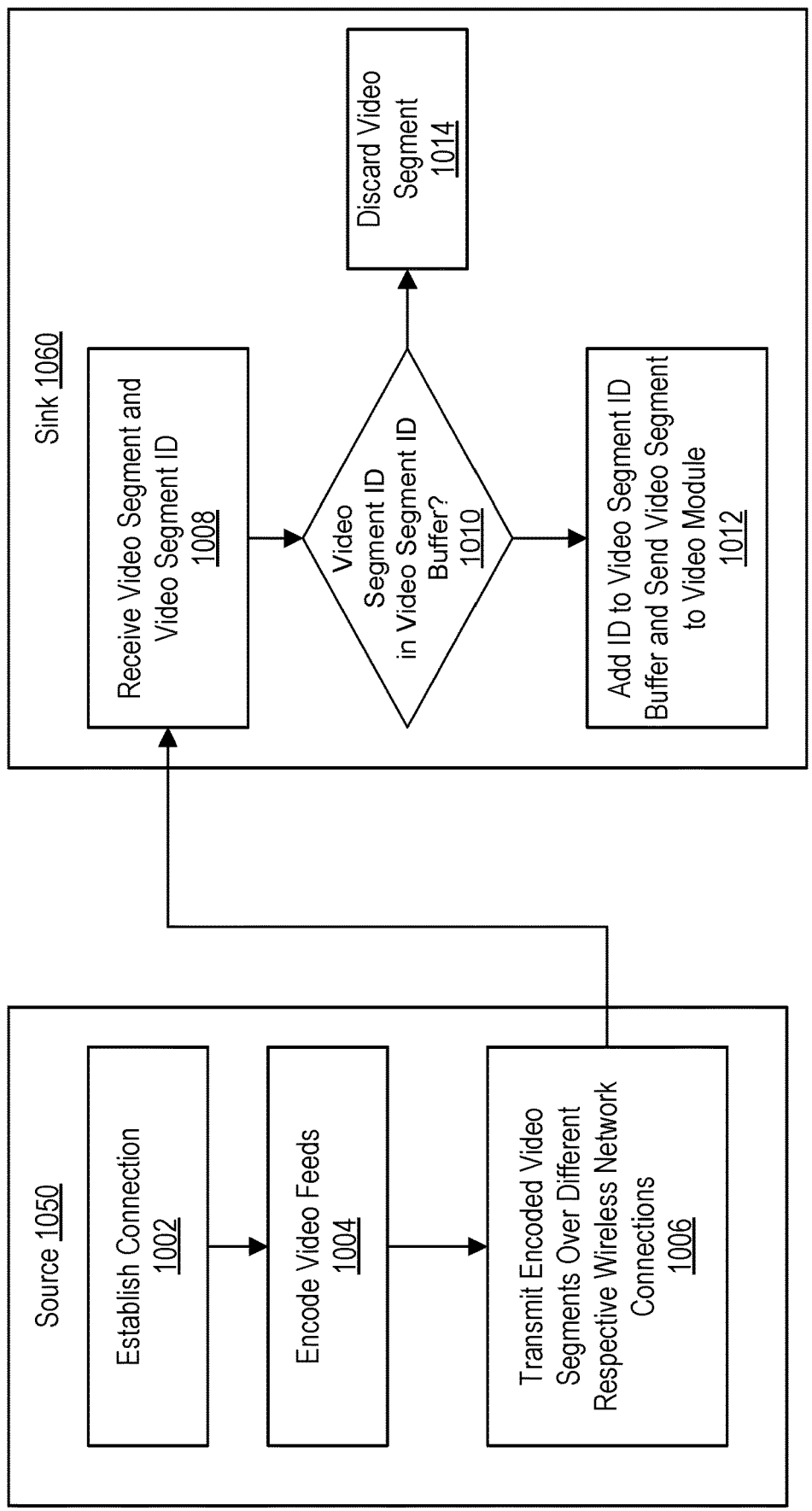
FIG. 10 is a flowchart illustrating an example embodiment of a process for wirelessly communicating redundant video data streams between a source and a sink using multiple wireless connections.

FIG. 10 illustrates an example embodiment of a process for wirelessly communicating low latency video from a source 1050 (e.g., a teleoperated vehicle or other robot) to a sink 1060 (e.g., a remote support server or other processing server). A connection is established 1002 between the source 1050 and the sink 1060. This connection may comprise, for example, a connection between a vehicle 102 and a remote support server 120 providing teleoperation services, a connection between a robot and a cloud processing server, or other application. The source receives a video feed and encodes 1004 the video feed to generate a set of two more encoded video segments having redundant video data. For example, in an embodiment, a first encoder encodes a first video segment to generate a first encoded video segment, and a second encoder encodes the first video segment to generate a second encoded video segment that includes redundant video data to the first encoded video segment. In other embodiments, more than two encoded video segments may be generated. The encoded video segments are transmitted 1006 over different respective wireless network connections. For example, a first communication unit transmits the first encoded video segment over a first wireless network connection and a second communication unit transmits the second encoded video segment over a second wireless network connection. Other embodiments may include more than two communication units that each transmit over different wireless networks connections. The different wireless network connections may operate according to different communication parameters, may be facilitated by different networks with different underlying network infrastructure, and/or may have varying performance characteristics that differently affect signal transmission of the different encoded video segments.

At the sink 1060, a video processor receives 1008 the encoded video segments together with segment identifiers for the video segments. As each video segment is received at the sink 1008, a video processor determines 1010 if the segment identifier is present in a segment ID buffer. If the segment identifier is not present in the segment identifier buffer, the video processor stores 1012 the segment identifier to the segment identifier buffer and provides the encoded video segment to a video module. If the video processor determines that the segment identifier is present in the segment identifier buffer, the video processor discards 1014 the second encoded video segment. In the process of FIG. 10, each video segment may comprise either a single frame or a set of multiple frames.

Figure 11:
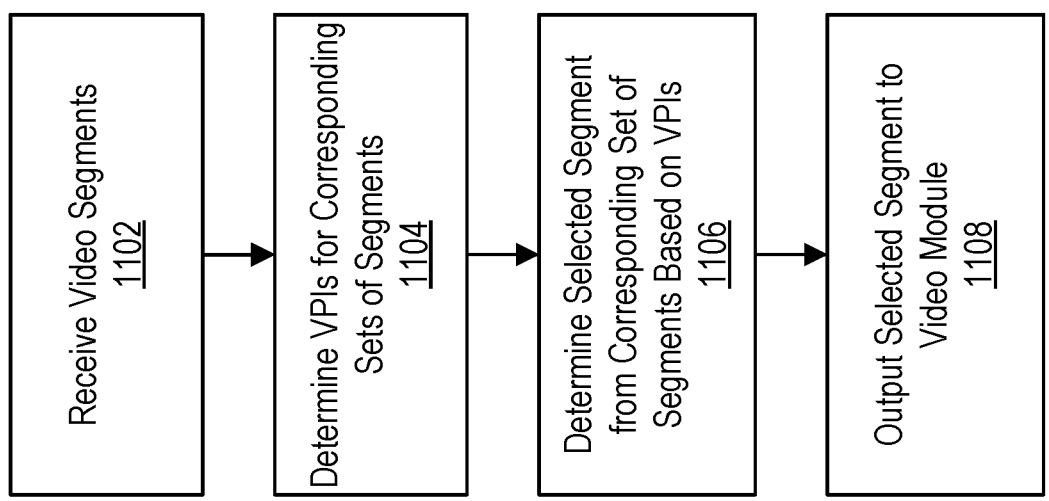
FIG. 11 is a flowchart illustrating an example embodiment of a process for wirelessly selecting between multiple redundant video segments at a sink.

FIG. 11 illustrates an alternative embodiment of a process performed at a sink 1060 for selecting between received video segments. In this embodiment, a video processor receives 1102 video segments from the multiple different network connections and determines 1104 VPIs for each segment within a set of corresponding segments. Here, the corresponding segments comprise segments encoded from the same original video segment and transmitted over different wireless network connections that may have different performance parameters. The VPIs may represent, for example, a quality measure, a latency measure, or other characteristic that may vary between segments due to the different network performance characteristics. The video processor then determines 1106 a selected video segment selected based on the respective VPIs, and outputs 1108 the selected video segment to a video device.

FIG. 12 illustrates another embodiment of a process for transmitting data over a plurality of wireless network connections from a source to a sink. In this embodiment, a source generates 1202 a set of redundant data streams and a network orchestrator generates 1204 assignments for transmitting the set of redundant data streams over multiple different network connections that may have varying performance characteristics. The assignments are made so that each data stream within a redundant set is assigned to a different network connection, and may be based on one or more optimization criteria. A plurality of communication units transmits 1206 the respective plurality of data streams over the multiple wireless network connections based on the assignments.

While many of the examples above relate to vehicle teleoperation applications, the wireless communication system described herein can apply to general remote support applications for robotics where low latency communications are desirable under varying network conditions. For example, the communication system may be employed in various cloud robotics applications. In one example, a robot may stream image or video data to an artificial intelligence server that performs real-time or substantially real-time content recognition. Such applications may be useful for inventory management, monitoring, security, or other robotics applications.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, the use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for wirelessly communicating low latency video from a vehicle to a remote support server during a remote support session, the method comprising:
   receiving a first video feed from a first camera;
   encoding, by a first encoder, a first video segment of the first video feed to generate a first encoded video segment, wherein the first encoder adjusts a set of encoding parameters for encoding the first video segment in response to network feedback indicating limited bandwidth conditions are present on a first wireless network connection;
   encoding, by a second encoder, the first video segment to generate a second encoded video segment, the second encoded video segment including redundant video data to the first encoded video segment;
   generating, by a network orchestrator, an assignment of the first encoded video segment for transmission by a first communication unit over the first wireless network connection, and an assignment of the second encoded video segment for transmission by a second communication unit over a second wireless network connection different than the first wireless network connection;
   transmitting, by the first communication unit, the first encoded video segment over the first wireless network connection;
   transmitting, by the second communication unit, the second encoded video segment over the second wireless network connection.

2. The method of claim 1, wherein encoding the first video segment by the first encoder comprises:
receiving at the first encoder, feedback parameters relating to transmission of prior encoded video segments over the first wireless network connection; and
adjusting encoding parameters of the first encoder based on the feedback parameters.

3. The method of claim 1, wherein encoding the first video segment by the first encoder comprises:
receiving location data associated with the vehicle;
determining encoding parameters from a geospatial database based on the location data; and
applying the encoding parameters when encoding the first video segment.

4. The method of 1, wherein encoding the first video segment by the first encoder comprises:
responsive to network feedback indicating limited bandwidth conditions are present on the first wireless network connection, encoding chromatic components of the first video segment at lower resolution than luminosity components of the first video segment.

5. The method of 1, wherein encoding the first video segment by the first encoder comprises:
responsive to network feedback indicating limited bandwidth conditions are present on the first wireless network, encoding the first video segment at a higher resolution if the first video frame is a key frame than if the first video segment is a non-key frame.

6. The method of claim 1, further comprising:
receiving a second video feed from a second camera;
encoding, by a third encoder, the second video segment to generate a third encoded video segment;
encoding, by a fourth encoder, the video segment to generate a fourth encoded video segment;
transmitting, by the first communication unit, the third encoded video segment over the first wireless network;
transmitting, by the second communication unit, the fourth encoded video segment over the second wireless network, the fourth encoded video segment including redundant video data to the third encoded video segment.

7. The method of claim 1, wherein encoding the first video segment by the first encoder comprises applying a first encoding format with first encoding parameters, and wherein encoding the first video segment by the second encoder comprises applying a second code with second encoding parameters different than the first encoding parameters.

8. The method of claim 1, wherein generating the assignments by the network orchestrator comprises:
applying an optimization algorithm to optimize the assignments according to a predefined optimization criterion.

9. The method of claim 8, wherein the optimization criterion comprises at least one of minimizing predicting latency, minimizing predicted network congestion, and maximizing predicted quality.

10. A non-transitory computer-readable storage medium storing instructions for wirelessly communicating low latency video from a vehicle to a remote support server during a remote support session, the instructions when executed by one or more processors causing the one or more processors to perform steps comprising:
receiving a first video feed from a first camera;
encoding, by a first encoder, a first video segment of the first video feed to generate a first encoded video segment, wherein the first encoder adjusts a set of encoding parameters for encoding the first video segment in response to network feedback indicating limited bandwidth conditions are present on a first wireless network connection;
encoding, by a second encoder, the first video segment to generate a second encoded video segment, the second encoded video segment including redundant video data to the first encoded video segment;
generating, by a network orchestrator, an assignment of the first encoded video segment for transmission by a first communication unit over the first wireless network connection, and an assignment of the second encoded video segment for transmission by a second communication unit over a second wireless network connection different than the first wireless network connection;
transmitting, by the first communication unit, the first encoded video segment over the first wireless network connection;
transmitting, by the second communication unit, the second encoded video segment over the second wireless network connection.

11. The non-transitory computer-readable storage medium of claim 10, wherein encoding the first video segment by the first encoder comprises:
receiving at the first encoder, feedback parameters relating to transmission of prior encoded video segments over the first wireless network connection; and
adjusting encoding parameters of the first encoder based on the feedback parameters.

12. The non-transitory computer-readable storage medium of claim 10, wherein encoding the first video segment by the first encoder comprises:
receiving location data associated with the vehicle;
determining encoding parameters from a geospatial database based on the location data; and
applying the encoding parameters when encoding the first video segment.

13. The non-transitory computer-readable storage medium of 10, wherein encoding the first video segment by the first encoder comprises:
responsive to network feedback indicating limited bandwidth conditions are present on the first wireless network connection, encoding chromatic components of the first video segment at lower resolution than luminosity components of the first video segment.

14. The non-transitory computer-readable storage medium of 10, wherein encoding the first video segment by the first encoder comprises:
responsive to network feedback indicating limited bandwidth conditions are present on the first wireless network, encoding the first video segment at a higher resolution if the first video segment is a key frame than if the first video segment is a non-key frame.

15. The non-transitory computer-readable storage medium of claim 10, further comprising:
receiving a second video feed from a second camera;
encoding, by a third encoder, the second video segment to generate a third encoded video segment;
encoding, by a fourth encoder, the video segment to generate a fourth encoded video segment;
transmitting, by the first communication unit, the third encoded video segment over the first wireless network;
transmitting, by the second communication unit, the fourth encoded video segment over the second wireless network, the fourth encoded video segment including redundant video data to the third encoded video segment.

16. The non-transitory computer-readable storage medium of claim 10, wherein encoding the first video segment by the first encoder comprises applying a first encoding format with first encoding parameters, and wherein encoding the first video segment by the second encoder comprises applying a second code with second encoding parameters different than the first encoding parameters.

17. The non-transitory computer-readable storage medium of claim 10, wherein generating the assignments by the network orchestrator comprises:
applying an optimization algorithm to optimize the assignments according to a predefined optimization criterion.

18. The non-transitory computer-readable storage medium of claim 17, wherein the optimization criterion comprises at least one of minimizing predicting latency, minimizing predicted network congestion, and maximizing predicted quality.

19. A vehicle system for wirelessly communicating low latency video from a vehicle to a remote support server during a remote support session, the vehicle system comprising:
a drive system for controlling operation of the vehicle;
a camera for generating a first video feed;
one or more processors;
a non-transitory computer-readable storage medium storing instructions that when executed by one or more processors causing the one or more processors to perform steps comprising:
receiving the first video feed from the camera;
encoding, by a first encoder, a first video segment of the first video feed to generate a first encoded video segment, wherein the first encoder adjusts a set of encoding parameters for encoding the first video segment in response to network feedback indicating limited bandwidth conditions are present on a first wireless network connection;
encoding, by a second encoder, the first video segment to generate a second encoded video segment, the second encoded video segment including redundant video data to the first encoded video segment;
generating, by a network orchestrator, an assignment of the first encoded video segment for transmission by over the first wireless network connection, and an assignment of the second encoded video segment for transmission over a second wireless network connection different than the first wireless network connection;
a first communication unit to transmit the first encoded video segment over the first wireless network connection; and
a second communication unit to transmit the second encoded video segment over the second wireless network connection.

20. The vehicle system of claim 19, wherein generating the assignments by the network orchestrator comprises:
applying an optimization algorithm to optimize the assignments according to a predefined optimization criterion.

* * * * *